United States Patent
Lee et al.

(10) Patent No.: US 11,734,686 B2
(45) Date of Patent: *Aug. 22, 2023

(54) AUTOMATED EVENT PROCESSING COMPUTING PLATFORM FOR HANDLING AND ENRICHING BLOCKCHAIN DATA

(71) Applicant: Bank of America Corporation, Charlotte, NC (US)

(72) Inventors: Jisoo Lee, Chesterfield, NJ (US); John C. Checco, Stony Point, NY (US); William August Stahlhut, The Colony, TX (US); Joseph Castinado, Northglenn, CO (US); Brad Romano, Furlong, PA (US); Suki Ramasamy, Chennai (IN); Patrick N. Lawrence, Pensacola, FL (US); Lekha Ananthakrishnan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,158

(22) Filed: Oct. 5, 2021

(65) Prior Publication Data

US 2022/0027908 A1    Jan. 27, 2022

Related U.S. Application Data

(63) Continuation of application No. 16/585,449, filed on Sep. 27, 2019, now Pat. No. 11,188,909, which is a
(Continued)

(51) Int. Cl.
*G06Q 20/40* (2012.01)
*H04L 9/40* (2022.01)
(Continued)

(52) U.S. Cl.
CPC ........ *G06Q 20/401* (2013.01); *H04L 9/0618* (2013.01); *H04L 9/3239* (2013.01);
(Continued)

(58) Field of Classification Search
None
See application file for complete search history.

(56) References Cited

U.S. PATENT DOCUMENTS

| 9,298,806 | B1 | 3/2016 | Vessenes et al. |
| 9,397,985 | B1 | 7/2016 | Seger, II et al. |

(Continued)

FOREIGN PATENT DOCUMENTS

CN        105930981 A        9/2016

OTHER PUBLICATIONS

Biswas, Kamanashis, Blockchain based Wine Supply Chain Traceability System, Nov. 2017, Future Technologies Conference, pp. 56-62 (Year: 2017).
(Continued)

*Primary Examiner* — Neha Patel
*Assistant Examiner* — Nicholas K Phan
(74) *Attorney, Agent, or Firm* — Banner & Witcott, Ltd.

(57) ABSTRACT

Methods and systems for using block chain technology to verify transaction data are described herein. A computing platform may receive data about events related to transactions, personal or corporate information, supply chains, and other relevant information about a person or corporate entity. The event information may be received, aggregated, and processed to determine metadata about the person or corporate entity. The metadata may indicate, for example, a trustworthiness of the person or corporate entity for various purposes. Such event information and/or metadata may be stored as transactions in a block chain that may be accessible by counterparties to a potential transaction involving the
(Continued)

person or corporate entity. The automated event processing computing platform may further use automated techniques to implement smart transactions between the person/entity and counterparty based on the trust metadata.

20 Claims, 19 Drawing Sheets

Related U.S. Application Data continuation of application No. 15/834,305, filed on Dec. 7, 2017, now abandoned.

(51) Int. Cl.
*H04L 9/06* (2006.01)
*H04L 9/32* (2006.01)
*H04L 9/00* (2022.01)

(52) U.S. Cl.
CPC ............ *H04L 9/3247* (2013.01); *H04L 63/10* (2013.01); *H04L 9/50* (2022.05); *H04L 2209/42* (2013.01); *H04L 2209/56* (2013.01)

(56) References Cited

U.S. PATENT DOCUMENTS

| | | | |
|---|---|---|---|
| 9,401,850 B2 | 7/2016 | Misra et al. | |
| 9,406,195 B2 | 8/2016 | Tung et al. | |
| 9,411,976 B2 | 8/2016 | Irvine | |
| 9,413,780 B1 | 8/2016 | Kaplan et al. | |
| 9,418,213 B1 | 8/2016 | Roth et al. | |
| 9,426,151 B2 | 8/2016 | Richards et al. | |
| 9,430,905 B2 | 8/2016 | Webb | |
| 9,440,152 B2 | 9/2016 | Thompson et al. | |
| 9,443,383 B2 | 9/2016 | Fine et al. | |
| 9,463,388 B2 | 10/2016 | Thompson et al. | |
| 9,466,051 B1 | 10/2016 | Roth et al. | |
| 9,473,524 B2 | 10/2016 | Kaplan et al. | |
| 9,489,798 B2 | 11/2016 | Fine et al. | |
| 9,501,791 B2 | 11/2016 | Dziuk | |
| 9,514,293 B1 | 12/2016 | Moritz et al. | |
| 9,516,035 B1 | 12/2016 | Moritz et al. | |
| 9,536,385 B2 | 1/2017 | Fine et al. | |
| 9,552,615 B2 | 1/2017 | Mathura et al. | |
| 9,552,694 B2 | 1/2017 | Fine et al. | |
| 9,552,696 B2 | 1/2017 | Fine et al. | |
| 9,553,888 B2 | 1/2017 | Stiansen et al. | |
| 9,558,524 B2 | 1/2017 | Madhu et al. | |
| 9,558,623 B2 | 1/2017 | Fine et al. | |
| 9,558,624 B2 | 1/2017 | Amone et al. | |
| 9,569,771 B2 | 2/2017 | Lesavich et al. | |
| 9,576,426 B2 | 2/2017 | Marshall et al. | |
| 9,619,967 B2 | 4/2017 | Fine et al. | |
| 9,633,513 B2 | 4/2017 | Webb | |
| 9,659,439 B1 | 5/2017 | Aleksey | |
| 9,665,239 B1 | 5/2017 | Koh et al. | |
| 9,667,427 B2 | 5/2017 | Oberhauser et al. | |
| 9,672,499 B2 | 6/2017 | Yang et al. | |
| 9,697,362 B2 | 7/2017 | Kaplan et al. | |
| 9,703,986 B1 | 7/2017 | Ashley et al. | |
| 9,721,296 B1 | 8/2017 | Chrapko | |
| 9,728,037 B2 | 8/2017 | Fine et al. | |
| 9,747,753 B2 | 8/2017 | Katz et al. | |
| 9,749,140 B2 | 8/2017 | Oberhauser et al. | |
| 9,754,490 B2 | 9/2017 | Kentley et al. | |
| 9,767,520 B2 | 9/2017 | Isaacson et al. | |
| 9,767,651 B2 | 9/2017 | Fine et al. | |
| 9,769,189 B2 | 9/2017 | Mohaisen et al. | |
| 9,779,557 B2 | 10/2017 | Hauser et al. | |
| 9,781,494 B1 | 10/2017 | Barakat et al. | |
| 9,807,092 B1 | 10/2017 | Gutzmann | |
| 9,815,191 B2 | 11/2017 | Oleynik | |
| 9,818,116 B2 | 11/2017 | Caldera | |
| 9,820,120 B2 | 11/2017 | deCharms | |
| 9,824,222 B1 | 11/2017 | Kaplan et al. | |
| 9,824,408 B2 | 11/2017 | Isaacson et al. | |
| 9,824,540 B2 | 11/2017 | Webb | |
| 9,836,790 B2 | 12/2017 | Ronca et al. | |
| 10,123,202 B1 | 11/2018 | Polehn et al. | |
| 10,554,649 B1 | 2/2020 | Fields et al. | |
| 2005/0223415 A1* | 10/2005 | Oho ..................... G06F 21/606 | |
| | | | 713/176 |
| 2012/0239557 A1 | 9/2012 | Weinflash et al. | |
| 2014/0019471 A1 | 1/2014 | Linton et al. | |
| 2015/0324789 A1 | 11/2015 | Dvorak et al. | |
| 2015/0356524 A1 | 12/2015 | Pennanen | |
| 2015/0363782 A1 | 12/2015 | Ronca et al. | |
| 2015/0363783 A1 | 12/2015 | Ronca et al. | |
| 2016/0180214 A1 | 6/2016 | Kanevsky et al. | |
| 2016/0261404 A1 | 9/2016 | Ford et al. | |
| 2016/0292680 A1 | 10/2016 | Wilson, Jr. et al. | |
| 2017/0140375 A1 | 5/2017 | Kunstel | |
| 2017/0140381 A1 | 5/2017 | Ducrohet et al. | |
| 2017/0178237 A1 | 6/2017 | Wong | |
| 2017/0230189 A1 | 8/2017 | Toll et al. | |
| 2017/0286717 A1 | 10/2017 | Khi et al. | |
| 2017/0323006 A1 | 11/2017 | Guzman et al. | |
| 2017/0353311 A1 | 12/2017 | Schukai et al. | |
| 2018/0025005 A1 | 1/2018 | Cao et al. | |
| 2018/0075527 A1 | 3/2018 | Nagla et al. | |
| 2018/0137479 A1 | 5/2018 | Mirakhor | |
| 2018/0189769 A1 | 7/2018 | Narasimhan et al. | |
| 2018/0248895 A1 | 8/2018 | Watson et al. | |
| 2018/0301051 A1 | 10/2018 | Isozu | |
| 2019/0012904 A1 | 1/2019 | Yusuf et al. | |
| 2019/0020468 A1 | 1/2019 | Rosenoer | |
| 2019/0034465 A1 | 1/2019 | Shimamura | |
| 2019/0097810 A1 | 3/2019 | Ghetie et al. | |
| 2019/0130394 A1 | 5/2019 | Stollman et al. | |
| 2019/0207767 A1 | 7/2019 | Ahn | |
| 2019/0227515 A1 | 7/2019 | Fink et al. | |
| 2019/0347738 A1 | 11/2019 | Ledesma et al. | |
| 2020/0250676 A1 | 8/2020 | Sierra et al. | |

OTHER PUBLICATIONS

Bousqaoui, Halima, Machine Learning applications in supploy chains An emphasis on neural network applications, 2017, IEEE (Year: 2017).

\* cited by examiner

600

Sign Up Process

Authorize Background Check? We will run your credit report.
    Yes   No

Complete a background check and link your accounts to complete the sign-up process.

Back      Next

Authorize Access to User Accounts?

Your credit report revealed 5 accounts: Please provide authorization credentials for at least the following 3 accounts:
Credit Card 1:    UserName:    Password:
Credit Card 2:    UserName:    Password:
Checking Account:    UserName:    Password:

Provide authorization credentials for the following accounts to receive additional incentives:
Automobile Loan:    UserName:    Password:
Mortgage:    UserName:    Password:

Back      Sign-up

FIG. 6B

AUTOMATED EVENT PROCESSING COMPUTING PLATFORM FOR HANDLING AND ENRICHING BLOCKCHAIN DATA

CROSS REFERENCE TO RELATED APPLICATIONS

This application is a continuation of patent application Ser. No. 16/585,449 entitled "Automated Even Processing Computing Platform for Handling and Enriching Blockchain Data" and filed on Sep. 27, 2019, which is a continuation of and claims priority to patent application Ser. No. 15/834,305 entitled "Automated Event Processing Computing Platform for Handling and Enriching Blockchain Data" and filed on Dec. 7, 2017, which is incorporated by reference in its entirety.

FIELD

Aspects described herein generally relate to electrical computers and digital processing systems, multicomputer data transferring, and distributed data processing. In particular, one or more aspects of the disclosure relate to digital processing systems that create and maintain block chain data structures.

BACKGROUND

Block chain systems are increasingly used to record transaction data via distributed computing devices. Block chains beneficially allow secure, distributed storage of event and transaction data that is verifiable and resistant to unauthorized usage. But existing systems for transacting with others via a block chain or otherwise do not provide sufficient information about the transaction counterparty or counterparties. For example, in transactions using some cryptocurrencies, a counterparty may be anonymous or pseudonymous. This may prevent or limit the adoption of cryptocurrencies for many common use cases. Additionally, lack of sufficient information about a potential counterparty may limit the ability to engage in transactions of assets via currencies or any other assets.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards effective, efficient, scalable, and convenient technical solutions for using block chain technology to verify transaction data.

According to one or more aspects described herein, a computing platform comprising one or more processors, memory, and a network interface receives, via the network interface, information identifying a user; retrieves, from one or more blocks of a blockchain stored in the memory, a plurality of historical information associated with the user; calculates, based on the historical information associated with the user, a trust level associated with the user; executes a function stored on the blockchain, wherein the function comprises conditional logic based on the trust level associated with the user; generates a new block comprising a data structure including data modified by the executed function; and transmits the new block to a plurality of nodes that maintain the blockchain.

In some cases, the computing platform, prior to the receiving of information identifying the user, receives user authorization to access records maintained by one or more systems that record events about the user; and receives, from the one or more systems that record events about the users, the historical information.

In some cases, the computing platform determines, based on the information identifying the user, a blockchain identifier associated with the user, wherein the new block comprises the blockchain identifier.

The computing platform may execute the conditional logic if the trust level is above a threshold. Additionally or alternatively, the computing platform may execute the conditional logic to adjust a value based on the trust level. Prior to the executing of the function, the computing platform may receive, from the user, a payment of a token associated with the blockchain.

According to some aspects, the memory of the computing platform comprises a plurality of user blockchains associated with a respective plurality of users, and the computing platform generates, for a main blockchain that is separate from the plurality of user blockchains, a second new block comprising the trust level; and transmits the second new block to the plurality of nodes that maintain the blockchain.

According to some aspects, generating the new block causes the computing platform to receive tokens associated with the blockchain.

According to some aspects, the computing platform generates, based on the historical information associated with the user and on historical information associated with other users, aggregated marketing data; receives, from a third party computing device, a request for the aggregated marketing data; and provides, to the third party computing device, the aggregated marketing data in exchange for tokens associated with the blockchain.

In some cases, the historical information comprises information about transactions with other users or entities, locations of the transactions, and amounts of the transactions. Additionally or alternatively, the historical information further comprises one or more of user demographic information, user credit report information, and information about user assets.

In some cases, the executed function initializes a second function for receiving a bid on a loan to the user.

According to one or more further aspects described herein, a computing platform comprising one or more processors, memory, and a network interface receives, via the network interface, information about a supply chain associated with a first corporate entity; retrieves, from one or more blockchains stored in the memory, information about a plurality of corporate entities associated with the supply chain; calculates, based on the information about the supply chain and on the information for the plurality of corporate entities, a trust level associated with the first corporate entity; executes a function stored on the blockchain, wherein the function comprises conditional logic based on the trust level associated with the first corporate entity; generates a new block comprising a data structure including data modified by the executed function; and transmits the new block to a plurality of nodes that maintain the one or more blockchains.

In some cases, prior to the receiving of the information about the supply chain, the computing platform receives credentials for accessing an interface of one or more computing devices associated with the first corporate entity.

According to some aspects, the information about the plurality of corporate entities associated with the supply chain further comprises information about supply chains respectively associated with the plurality of corporate entities.

In some cases, prior to the calculating of the trust level, the computing platform compares the information about the supply chains respectively associated with the plurality of corporate entities to the information about the supply chain associated with the first corporate entity, wherein the trust level is based on the comparison.

In some cases, the information for the plurality of corporate entities includes respective countries of incorporation for the plurality of corporate entities.

According to some aspects, the computing platform generates a second new block comprising the trust level; and transmits the second new block to the plurality of nodes that maintain the one or more blockchains. Additionally or alternatively, the one or more blockchains comprise a plurality of corporate entity blockchains respectively associated with the plurality of corporate entities, wherein the second new block is for a main blockchain that is separate from the plurality of corporate entity blockchains.

According to some aspects, the conditional logic only executes if the trust level is above a threshold. Additionally or alternatively, the conditional logic adjusts a value based on the trust level.

In some cases, prior to the executing of the function, the computing platform receives, from the first corporate entity, a payment of a token associated with the one or more blockchains.

According to some aspects, generating the new block causes the computing platform to receive tokens associated with the blockchain.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A and 6B illustrate example user interfaces in accordance with one or more illustrative aspects described herein.

DETAILED DESCRIPTION

Figure 1:
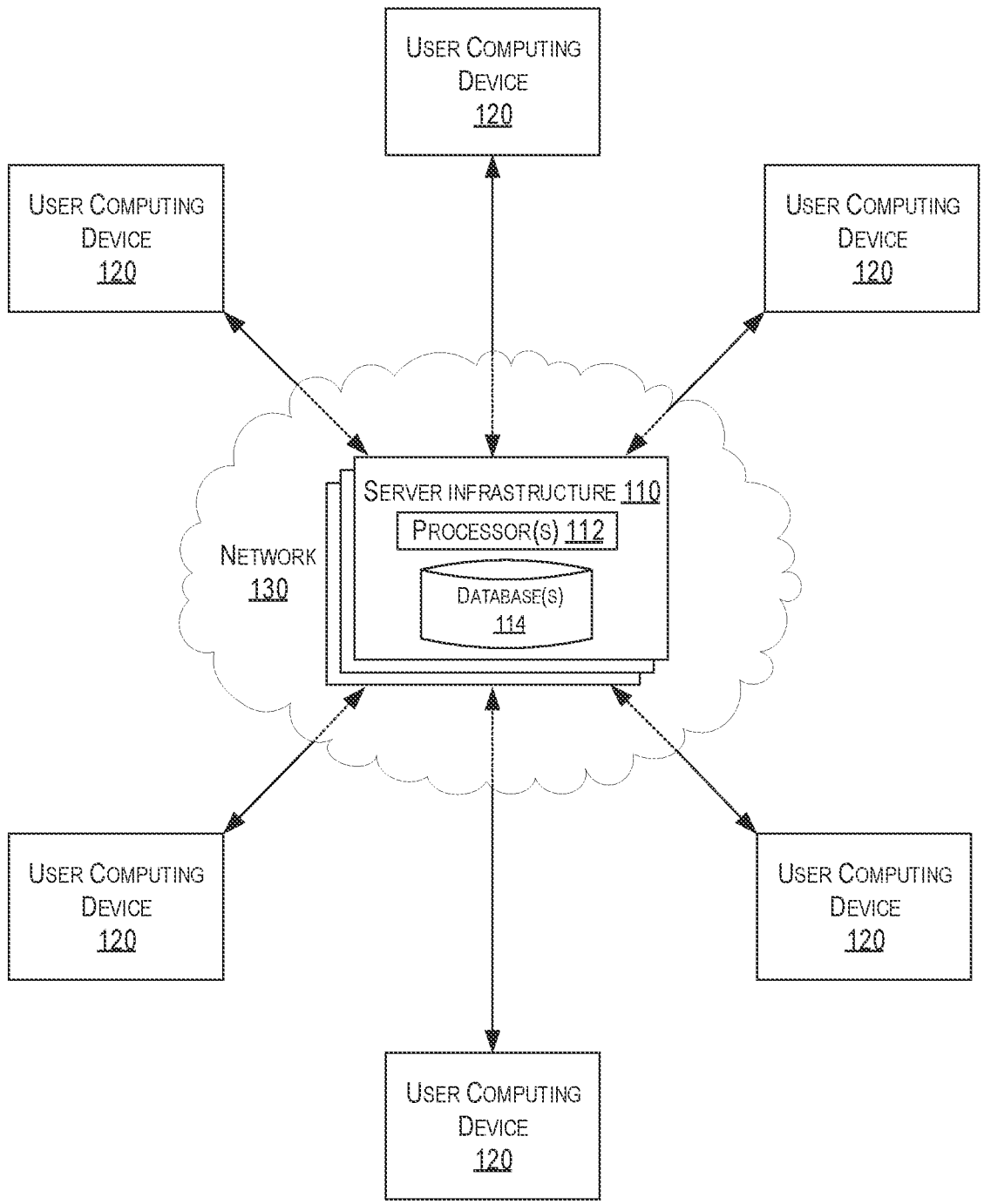
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using block chain technology to verify transaction data (e.g., by obtaining information about the trustworthiness of counterparties to a potential transaction). An automated event processing computing platform may receive data or other information about events related to financial transactions, personal and/or corporate information, supply chains, and other relevant information about a person or corporate entity. The event information may be received, aggregated, and processed to determine metadata about the person or corporate entity. The metadata may indicate, for example, a trustworthiness of the person or corporate entity for various purposes. Such event information and/or metadata may be stored as transactions in a block chain that may be accessible by counterparties to a potential transaction involving the person or corporate entity. The automated event processing computing platform may further use automated techniques to implement smart transactions between the person/entity and counterparty based on the trust metadata. The automated event processing computing platform may further provide services related to the information on the block chain, such as transaction verification, analysis of the metadata, and analysis of the event data to generate marketing, ad targeting, or other analytics information.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing one or more blockchains. The decentralized P2P system may comprise computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing one or more distributed ledgers, such as private blockchain(s) and/or public blockchain(s), through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices that are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices that are not participating as nodes within the decentralized public network.

Further, a "full node" or "full node computing device," as used herein, may describe a computing device in a decentralized system that operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions that can be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms that are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to each of the computing devices comprising server infrastructure 110. The local network connecting auto identification and mapping computing platform 120, system infrastructure 130, and/or post-performance review computing device 140 may interface with network 150 and enable communication with user computing devices 110A-110N.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure that, if compromised by a malicious attacker, can lead to data tampering, unauthorized data disclosure, and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
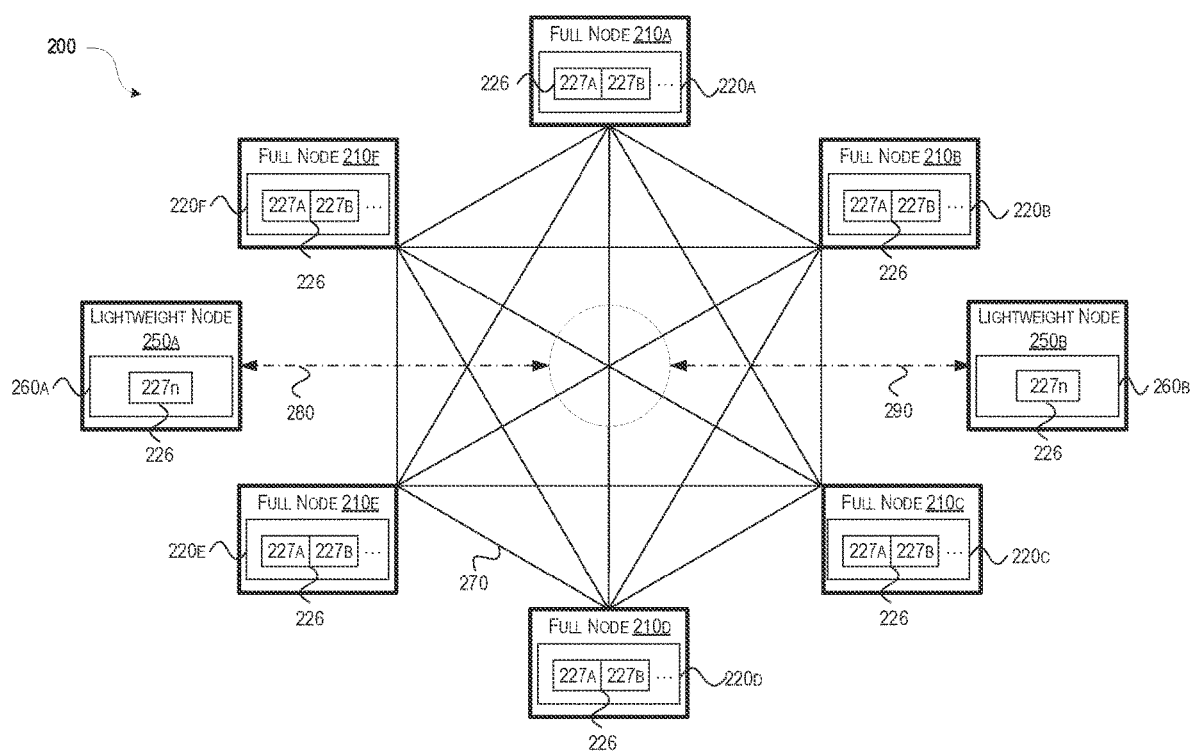
FIG. 2 depicts an illustrative example of decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and create decentralized P2P network 270. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as storing transaction information and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-210F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226.

The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated with lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3A:
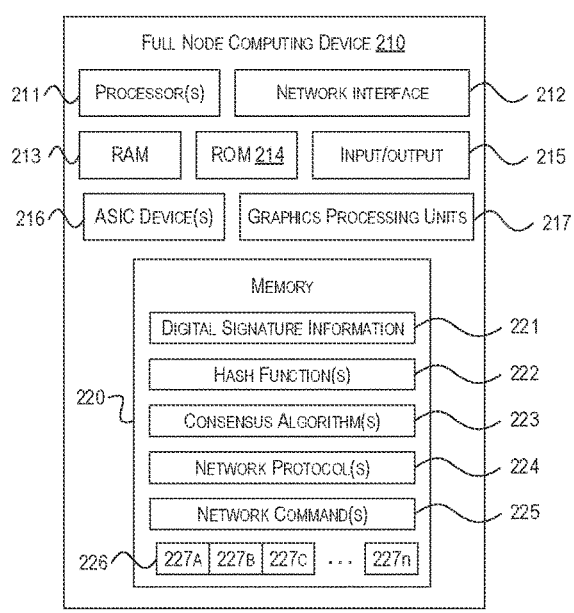
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

Figure 3B:
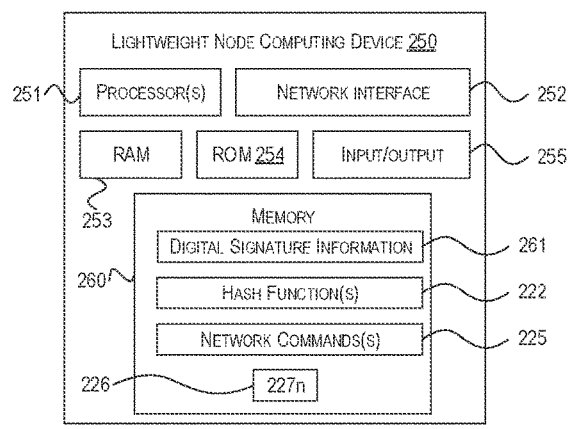
FIG. 3B depicts an illustrative example of a lightweight node computing device that may be used in accordance with one or more illustrative aspects described herein.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Block Chains Enriched With Event and Trust Information

Smart contracts, as described above, provide automatic execution of transactions according to programmatic conditions. Although smart contracts may partially mitigate the necessity of determining whether a counterparty can be trusted, smart contracts may, in some cases, be incomplete. Contracts cannot account for every contingency, and unforeseen disagreements may arise that may make further negotiation (beyond the provisions of a smart contract) necessary to resolve a dispute. Due to the possibility of such situations, entities that conduct transactions either on or off a block chain may be concerned with ensuring they can trust a transaction counterparty, even when smart contracts are used.

Blockchains enriched with event and/or trust information may provide additional information about a potential transaction counterparty that may help increase trust in the counterparty. Such enriched blockchains may include a history of information about a user or a corporate entity and trust information derived therefrom. The historical information may include previous transactions involving the user or corporate entity, background information about the user or corporate entity, as well as supply chain information for a corporate entity. Multiple blockchains may store such information in order to increase the scalability of the system. For example, a main blockchain may include trust information for users and/or corporate entities, while several sidechains may include historical information (which may include a very large volume of event information) for the users and/or corporate entities.

Figure 4:
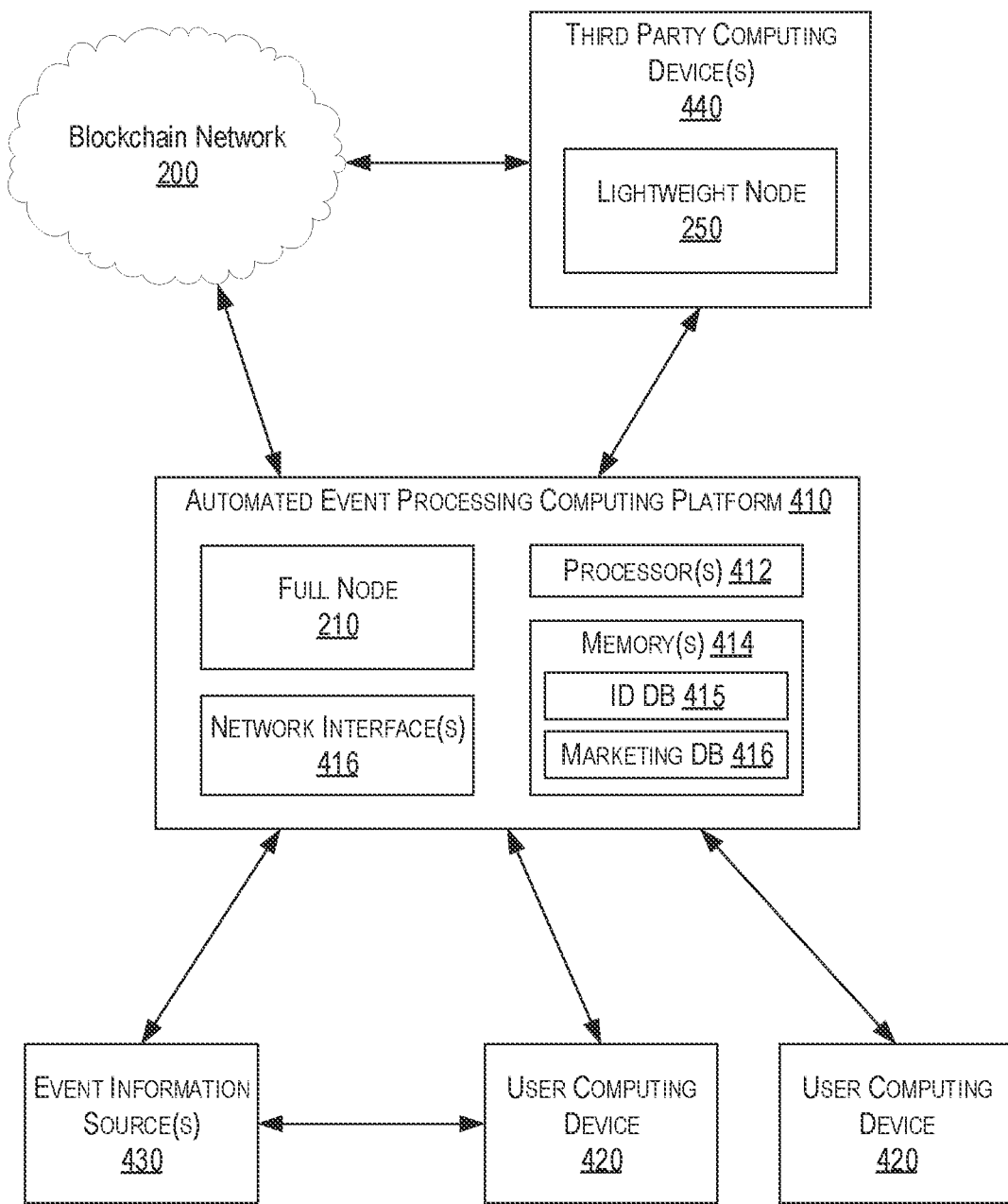
FIG. 4 depicts an illustrative operating environment for implementing aspects described herein.

FIG. 4 depicts an illustrative system and operating environment for implementing features of the present disclosure, including generating and maintaining a blockchain containing trust information for users. An automated event processing computing platform 410 may connect to a blockchain network, such as blockchain network 200 illustrated at FIG. 2. The automated event processing computing platform 410 may implement a node of the blockchain network, such as a lightweight node 250 and/or (as illustrated) a full node 210 such that the automated event processing computing platform 410 may participate in the one or more blockchains of the blockchain network 200. The automated event processing computing platform 410 may implement the node as a physical device that makes up part of the automated event processing computing platform 410 and/or may implement the node as a virtualized device and/or software module running inside hardware of the automated event processing computing platform 410. In some examples, the automated event processing computing platform 410 may implement multiple (e.g., virtualized) nodes that interact with multiple blockchains (e.g., one blockchain per node) on the same blockchain network 200 and/or different blockchain networks.

The automated event processing computing platform 410 may connect to the blockchain network 200 through intermediate networks, including private networks, the Internet, or any other networks. The automated event processing computing platform 410 may further connect to one or more third party computing devices 440, which may interact with the automated event processing computing platform 410 and or other devices connected to the blockchain network 200 to perform various functions. The third party computing devices 440 may implement a full node 210 and/or (as illustrated) a lightweight node 250 in order to interact with the blockchain network 200. The third party computing device 440 may implement the node as a physical device that makes up part of the third party computing device 440 and/or may implement the node as a virtualized device and/or software module running inside hardware of the third party computing device 440. In some examples, the third party computing device 440 may implement multiple (e.g., virtualized) nodes that interact with multiple blockchains (e.g., one blockchain per node) on the same blockchain network 200 and/or different blockchain networks. For example, various ones of the third party computing devices 440 may generate blocks for the blockchain(s), interact with smart contracts related to and/or implemented on the blockchain(s) of blockchain network 200, request transaction information, and/or request marketing data for use by the third party.

The automated event processing computing platform 410 may further connect to the one or more user computing devices 420. The user computing devices 420 may be customers of services provided the automated event processing computing platform 410. For example, the users associated with the user computing devices 420 may maintain accounts and credentials for services offered by the automated event processing computing platform 410. Additionally or alternatively, the users of user computing devices 420 may be users who wish to interact with (e.g., perform a transaction with) customers of services provided by the automated event processing computing platform 410.

The automated event processing computing platform 410 may further connect to one or more event information source(s) 430, from which the automated event processing computing platform 410 may receive information about events related to the users of the user computing devices 420. For example, the event information source(s) 430 may provide information about transactions related to a user (e.g., credit card purchases of the user, other payments from or to the user, and the like), background information about a user (e.g., demographics information, educational information, background check information, financial records, credit reports, and the like), and other such information about the user. In some cases, a user of user computing device 420 may provide authorization to the automated event processing computing platform 410 and/or event information source(s) 430 before the automated event processing computing platform 410 receives event information from the event information sources 430. Additionally or alternatively, the automated event processing computing platform 410 may receive event information directly from the user (e.g., information about a cash purchase to or from the user, a smart contract created by or used by the user, and the like).

After receiving event information from the event information source(s) 430 and/or the user computing devices 420, the automated event processing computing platform 410 may analyze the various event information to generate trust information for the user. The automated event processing computing platform 410 may further execute functions related to smart contracts involving the user (which may programmatically leverage the trust information), provide the trust information to the user or other parties, provide proofs of payment, and provide marketing data, among other functions. The automated event processing computing platform 410 may execute the method of FIGS. 5A-5F to perform these and other functions.

Figure 5A:
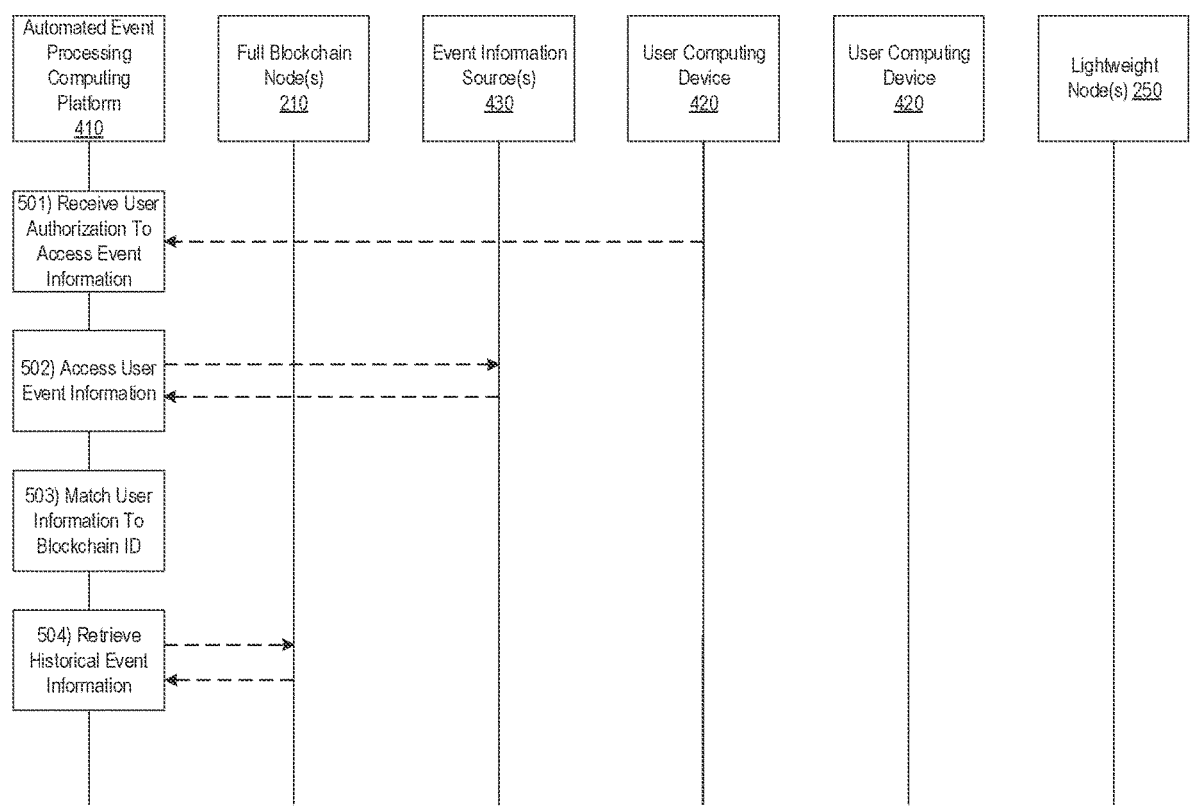
FIGS. 5A, 5B, 5C, 5D, 5E, and 5F illustrate an example process that may be implemented by a computing platform in accordance with one or more aspects described herein.

FIGS. 5A-5F depict an example method by which the automated event processing computing platform 410 may perform functions described herein. Turning to FIG. 5A, at step 501, the automated event processing computing platform 410 may receive user authorization to access event information. A user may thus designate an institution (e.g., a financial institution) associated with the automated event processing computing platform 410 as a custodian of the user's event information (and by extension, as a custodian of one or more user blockchains containing the authorized event information, as further discussed below). For example, a user may log into a portal provided by the automated event processing computing platform 410 and provide authorization for the automated event processing computing platform 410 to receive event information from one or more event information sources 430. An example of such a user authorization portal is depicted at FIGS. 6A-6B. FIG. 6A illustrates a screen 600 generated by the automated event processing computing platform 410 and transmitted to a user computing device 420 (e.g., as a web page) during a sign-up process. In the illustrated example, the automated event processing computing platform 410 may require a user to consent to running a background check including a credit report to discover accounts and credit history associated with the user. In other examples, the user may provide such information without having to run a credit report and/or the automated event processing computing platform 410 may obtain the required information from some other source.

FIG. 6B illustrates another screen 650 generated by the automated event processing computing platform 410 and transmitted to a user computing device 420 (e.g., as a web page) during the sign-up process. In the illustrated example, the user may provide authorization credentials for one or more user accounts so that the automated event processing computing platform 410 may access computing devices (e.g., event information sources 430) associated with each account in order to retrieve event information associated with the user. Additionally or alternatively, the user may directly connect to event information sources 430 and instruct one or more of the event information sources 430 to transmit event information for the user to the automated event processing computing platform 410.

The automated event processing computing platform 410 may require the user to provide access and/or authorization for some (as illustrated) or all of the user's accounts. For example, the automated event processing computing platform 410 may require the user to provide access to each account of a first type (e.g., revolving debt accounts, checking accounts, and the like) in order to complete a sign-up process and may provide the user with incentives (e.g., reduced fees, reduced advertising, additional services, blockchain tokens, and the like) to provide access to additional accounts of a second type. As another example, the automated event processing computing platform 410 may provide the user with additional incentives for each additional account for which the user provides access and/or authorization. Such incentives may include a certain number of blockchain tokens based on the number of accounts the user adds and/or an agreement to provide the user a certain number of blockchain tokens for each event associated with the user that is added onto the blockchain(s).

In some cases, the automated event computing platform 410 may also receive additional information (e.g., for users with limited financial or credit records). Users may provide access to school records, standardized test scores, mobile phone accounts and/or payment histories, and other such information. The user may upload such information (e.g., copies of report cards, transcripts, phone bills, and the like) and/or provide credentials so that automated event computing platform 410 may retrieve such information from event information sources 430. In some cases, automated event computing platform 410 may only consider such information if it detects that the user has limited credit history (e.g., less than a threshold number of financial accounts or under a threshold amount of debt).

The automated event processing computing platform 410 may be configured to not require the user to provide authorization and/or access to some or all of the event information sources 430. For example, the automated event processing computing platform 410 may be owned and/or maintained by a financial institution that also maintains one or more user accounts (e.g., a credit card and/or checking accounts), so the automated event processing computing platform 410 may already have access to events for those particular user accounts.

After completing step 501, the automated event processing computing platform 410 may be able to access event information associated with the user from the one or more event information sources 430. Accordingly, at step 502, the automated event processing computing platform 410 may send periodic requests to the one or more event information sources 430 and responsively receive event information therefrom. Additionally or alternatively, some or all of the event information sources 430 may proactively push the event information (e.g., upon occurrence of a relevant transaction) to the automated event processing computing platform 410.

At step 503, the automated event processing computing platform 410 may match the received event(s) that are associated with a particular user to a corresponding blockchain identifier. One or more of the blockchains 200 implemented by the blockchain network 200 may use a persistent blockchain identifier to store information associated with a particular user. The automated event processing computing platform 410 may store such a blockchain identifier in an identity database 415, as illustrated at FIG. 4. The identity database 415 may contain the blockchain identifier as well as other identifiers of the user (e.g., a name of the user, account username(s) and/or numbers of the user, and other user identity information). When the automated event processing computing platform 410 receives event information, the event information may indicate that an event is associated with a user identifier, which the automated event processing computing platform 410 may extract and use to retrieve the matching blockchain identifier for the user from the identity database 415. Additionally, if the event includes multiple parties (e.g., a counterparty to a transaction), the automated event processing computing platform 410 may also extract the other party identifiers and determine corresponding blockchain identifiers.

At step 504, the automated event processing computing platform 410 may retrieve historical event information associated with the user. The historical event information may be stored on one or more blockchains of the blockchain network 200. In some examples, each user may be associated with a user blockchain, which may be identified by the user's blockchain identifier. The automated event processing computing platform 410 may access the user blockchain, which may be stored in memory 220 of the full node computing device 210 that is part of the automated event processing computing platform 410 (and/or in memory 260 that is part of the lightweight node computing device 250 that is part of the automated event processing computing platform 410) and access the historical event information stored on the user blockchain. The automated event processing computing platform 410 may access all of the historical event information starting from the beginning of the blockchain and/or may access only some of the historical event information (e.g., the most recent 7 years). In some cases, the automated event processing computing platform 410 may ignore (e.g., not access or filter out from the accessed information) historical event information stored in blocks that have timestamps earlier than a threshold date (e.g., 7 years in the past).

In some cases, a user blockchain may be partially or wholly stored on another full node 210 (e.g., not every full node 210 of the blockchain network 200 may store each user blockchain or the entirety of each user blockchain). Accordingly, if the automated event processing computing platform 410 does not have all or part of the user blockchain containing the historical event information for the user, the automated event processing computing platform 410 may request the relevant user blockchain (e.g., by sending a request for a user blockchain associated with the user's blockchain identifier) from another full node 210 of the blockchain network 200 that does have such information.

The user blockchains may be sidechains that relate to a main chain containing the trust information. In other words, a main chain may include trust information for the users, and one or more other sidechains may include the event information for some or all of the users. In this example, the automated event processing computing platform 410 may regularly add received event information to the one or more side chains and periodically update the trust information on the main chain.

Figure 5B:
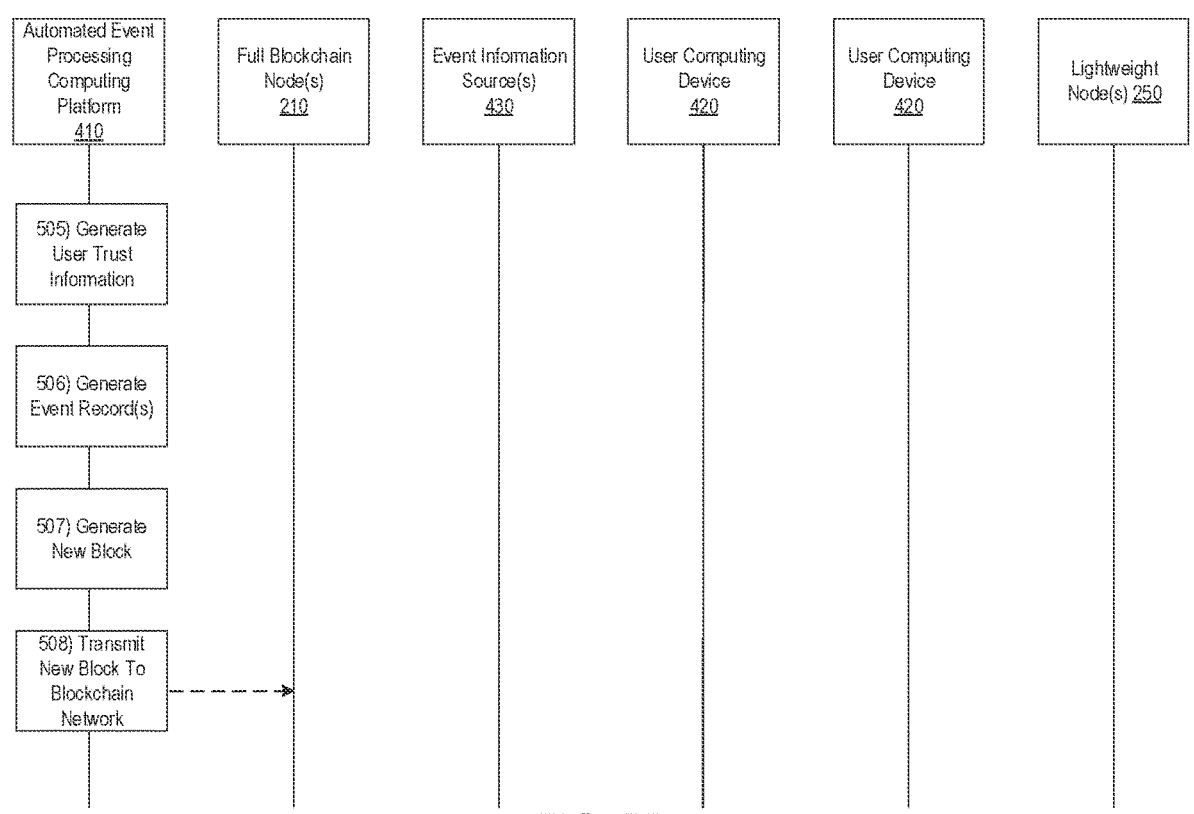

Turning to FIG. 5B, at step 505 the automated event processing computing platform 410 may generate user trust information based on the received event information and the historical event information retrieved at step 504. The automated event processing computing platform 410 may use one or more models to generate the trust information using the event information (e.g., the received event information and the historical event information) as an input. The one or more models may be trained by the automated event processing computing platform 410 using machine learning and/or statistical techniques.

For example, prior to executing the method of FIGS. 5A-5F, the automated event processing computing platform 410 may have trained a model to output trust information using a training data set comprising event information for a large number of users and one or more target variables. The event information may include transaction information, which may indicate an asset that was exchanged, a value of the asset, whether the corresponding user in the training data set was a buyer or seller of the asset, a time of the asset exchange, a location of the corresponding user at the time of the asset exchange, as well as similar such information for the transaction counterparty. The event information may further include background information for the corresponding user of the training data set, such as education level, place of residence, background, credit history, and other such information about the corresponding user. The one or more target variables may indicate, for example, whether the corresponding user in the training data set made payments on a loan obligation, performed or failed to perform part of a contract, or other evidence of high or low financial trustworthiness. The automated event processing computing platform 410 thus may train the one or more models using the training data set to output trust information (e.g., by developing a neural network that maps the input data to the one or more target variables).

The trained model(s) may tend to indicate higher or lower levels of trust based on the event information (including transaction information and user information) and associated data. For example, the trained model may tend to indicate a lower level of trust if the historical event information indicates a high amount of spending and a low amount of income. As another example, the trained model may tend to indicate a lower level of trust if the user makes several large transactions in certain locations (e.g., Las Vegas) as opposed to other locations. As another example, the trained model may tend to indicate a higher level of trust based on certain user information (e.g., a high level of education, an older age) or a lower level of trust based on other user information (e.g., negative items on a background check). Accordingly, the model may determine trust information based on the inputted event information. The trust information may be a continuous numerical value (e.g., a score within a range) and/or a discrete category. For example, discrete categories may include a range (e.g., from trust category 1 up to trust category 5) and/or clusters (e.g., demographic and/or behavioral clusters such as a cluster for high income earners, a cluster for frugal spenders, a cluster for frequent gamblers, and the like).

The automated event processing computing platform 410 may avoid executing step 505 to generate trust information each time a new event is received for a user. For example, the automated event processing computing platform 410 may check a timestamp associated with the most recent generated trust information (which may be stored in a block 227 of a main blockchain 226 of the blockchain network 200), and generate trust information if the timestamp is older than a certain threshold period of time. As another example, the automated event processing computing platform 410 may determine that a certain threshold number of events have been stored on a blockchain (e.g., a side blockchain containing user event information) since the last trust information was generated, and responsively generate updated trust information.

Returning to FIG. 5B, at step 506, after generating the trust information by inputting the received event information and historical event information into the trained model to output the user trust information, the automated event processing computing platform 410 may generate an event record containing information about the received event and/or the generated trust information. The automated event processing computing platform 410 may create the event record and, if the event represents a transaction, populate it with transaction information such as the seller of an asset (e.g., the blockchain identifier of the user if the user is the seller, or of the counterparty if the counterparty is the seller), the buyer of an asset, any other parties involved in the transaction, and an amount of the asset. As another example, if the event involves new or changed user information (e.g., a new address, a new job, a new credit card account, and the like), the automated event processing computing platform 410 may populate the event record with relevant information such as the identifier of the associated user (e.g., the blockchain identifier), the new or changed information, and a party that reported the new or changed information (e.g., using a blockchain identifier of the reporting party).

In some cases, the event record may also include the trust information. The automated event processing computing platform 410 may thus include trust information in the blockchain together with the event information. Additionally or alternatively, the trust information may be stored on one blockchain (e.g., a main chain) and the event information may be stored on another blockchain (e.g., a sidechain). For events involving two or more parties (e.g., transactions from one party to another party), events may be generated for different blockchains corresponding to each party. For example, the automated event processing computing platform 410 may generate records for both a seller associated with a first user blockchain and a buyer associated with a second user blockchain, Therefore, at step 506 the automated event processing computing platform 410 may generate two or more event records (one for each blockchain on which the event and/or trust information will be stored).

At step 507, the automated event processing computing platform 410 may generate one or more new blocks containing several event records associated with a plurality of events (e.g., after receiving event information for a plurality of transactions related to a plurality of users). It should be understood that steps 501-506 could be repeated (e.g., sequentially or in batches) for a plurality of events related to a plurality of users before generating a new block comprising event records for the plurality of events. Therefore, the generated new block may comprise a large number of event records. The event records may include event information and/or trust information, as well as other types of data for storage on the blockchain, such as smart contracts, which will be further discussed below.

If the automated event processing computing platform 410 generates event records for more than one blockchain (e.g., a main chain and one or more side chains), the automated event processing computing platform 410 may repeat step 507 to generate the new blocks for the multiple blockchains.

In some cases (e.g., for a public blockchain), the automated event processing computing platform 410 may be required to solve a difficult mathematical problem (e.g., if the blockchain network 200 uses a proof of work consensus algorithm) or otherwise demonstrate entitlement to generate the new block before generating the new block. Consensus algorithms are described in more detail above in the "Computing Architectures" section. In other cases (e.g., for a permissioned blockchain), the automated event processing computing platform 410 may be a trusted node and therefore may not need to demonstrate entitlement to generate the new block in accordance with a consensus algorithm.

When the automated event processing computing platform 410 successfully generates a new block, it may receive tokens associated with the blockchain as a reward for contributing to the blockchain by mutual agreement of all the nodes of the blockchain network 200. The automated event processing computing platform 410 may be required to share some of the tokens with the users associated with the events and/or trust information of the new block. The users may thus receive tokens as an incentive to store their associated event and/or trust information on the blockchain(s).

At step 508, the automated event processing computing platform 410 may transmit the generated new block(s) to the other full nodes 210 of the blockchain network 200. Each full node 210 may verify the new block and add the new block to the blockchain, and the blockchain will continue growing therefrom.

Figure 5C:
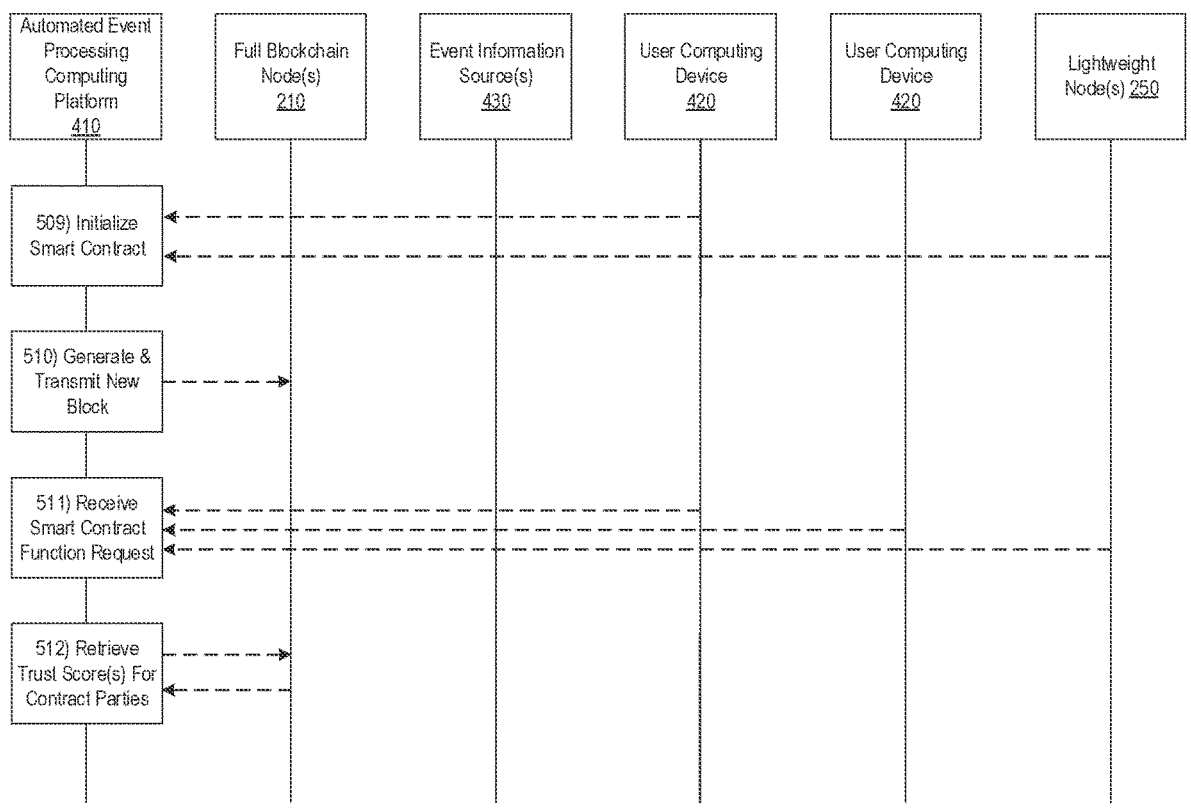

Turning to FIG. 5C, at step 509, the automated event processing computing platform 410 may receive a request (e.g., from a user or a lightweight node 250) to initialize a smart contract. The smart contract may contain executable instructions that may be placed on the blockchain (e.g., in an event record of a new block). The smart contract may include an initialization function that the automated event processing computing platform 410 may execute before placing the initialized smart contract on the blockchain. For example, the initialization function may create data structures, populate variables, and create other such data for use by the smart contract. Thus, a new event record containing the smart contract may contain executable code as well as associated data.

Initializing a smart contract may require the requesting user to pay a certain amount of blockchain tokens (e.g., to the automated event processing computing platform 410 for initializing the smart contract). The amount may vary based on the complexity of the smart contract and/or the initialization function (e.g., how much processing power is required to execute the smart contract and/or initialization function). Additionally or alternatively, the amount may vary based on the length of the smart contract and associated data (e.g., in bytes). The lightweight nodes 250 may obtain tokens from users (e.g., using incentives as discussed above) or otherwise purchase tokens so that they may pay the required amount of tokens to initialize and/or execute the smart contract. Similarly, users that do not have sufficient tokens to execute or initialize a smart contract may purchase the tokens (e.g. on a token exchange or from another user) before sending a request.

At step 510, the automated event processing computing platform 410 may again generate and transmit a new block containing event records including an event record containing the (initialized) smart contract. As discussed above for steps 507-508, the new block may contain a plurality of other event records for various events (e.g., transactions, user information, other smart contracts, and the like), and the automated event processing computing platform 410 may transmit the new block to the other nodes on the blockchain network 200.

At step 511, the automated event processing computing platform 410 may receive a request to execute a function of the smart contract. The request may be received from any party; however, the smart contract may specify which parties are allowed to invoke certain functions. Some functions may only be accessed by the user that created the smart contract. For example, a user may create a smart contract to purchase goods containing a function that allows the user to designate the goods as satisfactory quality before the user's payment is released to the seller. Accordingly, the request may contain a value that the function of the smart contract may use to execute conditional or other logic. As another example, the smart contract may have a function to cancel the smart contract that only the creator may access.

Some functions may be accessed by potential counterparties. For example, a user looking for a loan may create a smart contract to allow potential lenders to bid on a loan to the user. The potential bidders may access a smart contract function for offering a particular amount and/or interest rate. The potential counterparties may send the request to execute the function via a user computing device 420 (e.g., if another user is bidding on the loan) and/or via third party computing devices 440 (e.g., if a financial institution is bidding on the loan). Accordingly, the request may contain multiple values (e.g., an interest rate, a loan amount, and the like) that the smart contract may use and/or store. Such a bidding function may be configured to receive multiple offers before deciding (e.g., automatically and/or based on user input) which offer(s) to accept.

The request to perform the smart contract function may specify a smart contract address and the function to be executed. Based on the smart contract address, the automated event processing computing platform 410 may identify a block of the blockchain that stores the smart contract, retrieve the identified block, and extract the smart contract. The automated event processing computing platform 410 may also require payment of a certain amount of blockchain tokens for executing the smart contract function. Therefore, the function request may also include a token payment to a blockchain address associated with the automated event processing computing platform 410.

The request to perform the smart contract function may further include an authorization to execute the smart contract function. For example, the request may include data signed by the private key of the user that created the function in order to demonstrate the user's authorization. In this way, the user may control who is able to access the functions of the smart contract by selectively providing authorization (e.g., by signing their requests) to parties that wish to execute smart contract functions. Additionally or alternatively, the user may allow some functions to be executed by anyone (e.g., without authorization).

The smart contract may beneficially access the user trust information stored on the blockchain. For example, a function of the smart contract (including an initialization function or any other function) may conditionally execute a function based on a value of the trust information for a user or a counterparty. Thus a function of the smart contract may only execute if a user or counterparty is associated with a sufficiently high level of trust and/or if the user or counterparty falls into one of a subset of discrete trust categories. For example, a smart contract for a loan may require reduced collateral and/or a reduced interest rate if the loanee has a qualifying (e.g., over a first threshold value) trust information. Additionally or alternatively, the loan smart contract may only allow loans to be made to loanees with sufficiently high (e.g., over a second threshold value) trust information. In the loan example, the second threshold value may be lower than the first threshold value.

Therefore, at step 512, the automated event processing computing platform 410 may retrieve trust information for one or more parties of the contract as needed before executing the requested function. If the automated event processing computing platform 410 does not have access to trust information (e.g., if the automated event processing computing platform 410 implements a lightweight node 250 that does not store an entire blockchain), the automated event processing computing platform 410 may request the trust information from other nodes on the blockchain network 200 by sending a request to another node to retrieve trust information associated with a blockchain identifier. The other node may respond with one or more relevant blocks 227, which the automated event processing computing platform 410 may verify before extracting the trust information.

Figure 5D:
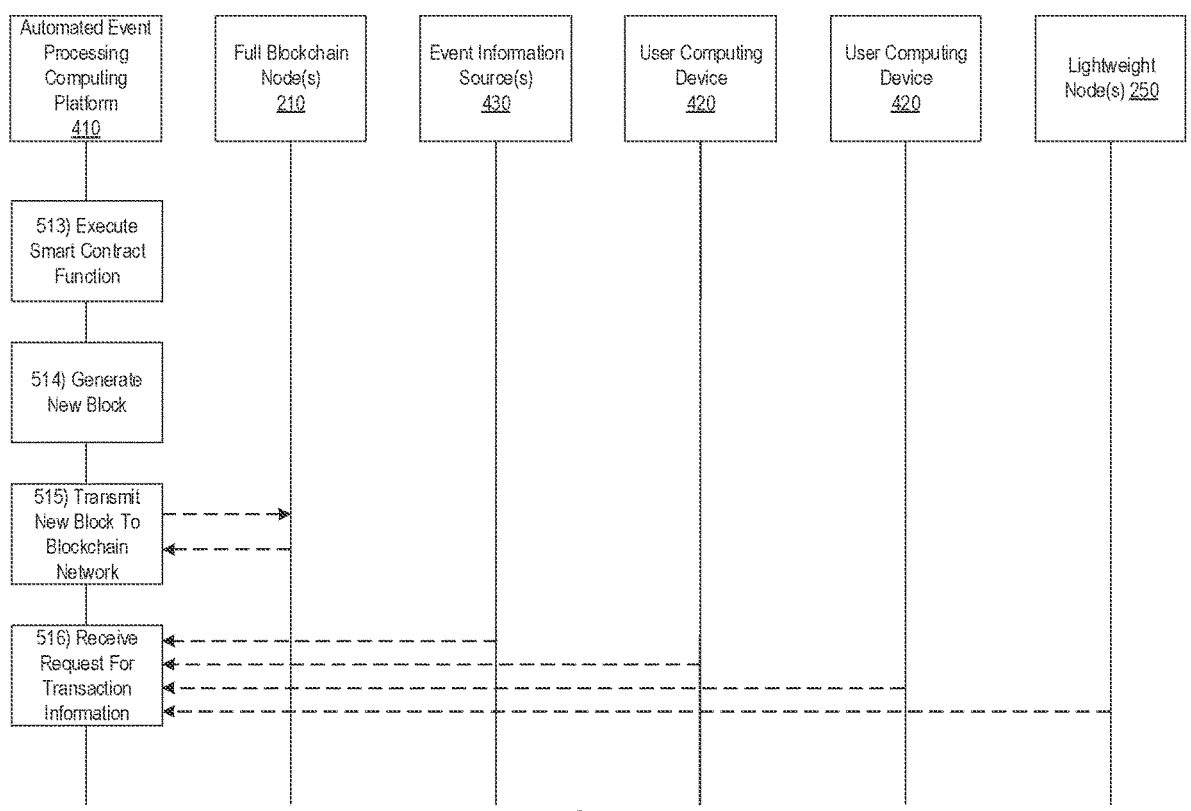

Turning to FIG. 5D, at step 513, the automated event processing computing platform 410 may execute the smart contract function. Execution of some functions may require updating the blockchain (e.g., in order to store data generated or changed during the execution of the function). For example, if the function receives a loan bid from a potential lender, the function may require an update in order to store the bid on the blockchain. Execution of other functions may not require any blockchain update. For example, some functions may allow users to read or view data previously generated or stored by the smart contract.

At step 514, if the function causes data to be generated and/or modified, a new event record storing the updated state of the smart contract may be generated. The event record may store any updated data structures and/or other data that was changed by executing the smart contract function.

At step 515, the automated event processing computing platform 410 may again generate and transmit a new block containing event records including the event record with the updated smart contract information. As discussed above for steps 507-508, the new block may contain a plurality of other event records for various events (e.g., transactions, user information, other smart contracts, and the like), and the automated event processing computing platform 410 may transmit the new block to the other nodes on the blockchain network 200.

At step 516, the automated event processing computing platform 410 may receive a request for transaction information. A user (or some other party) may seek information about a transaction that was placed on a blockchain. The request may identify the event record associated with the transaction if known. Additionally or alternatively, the request may identify the parties to the transaction, the amount of the transaction, the time of transaction, or provide some other criteria for finding the transaction.

The automated event processing computing platform 410 may use the criteria to find one or more transactions matching the criteria by searching the transactions on the one or more blockchains. In examples that use multiple blockchains, identity information for the user and/or counterparty may be used to lookup corresponding blockchain identifier(s) (e.g., as discussed above for step 503), which may be used to select a particular blockchain (e.g., a particular user side chain) to search for the transaction.

Figure 5E:
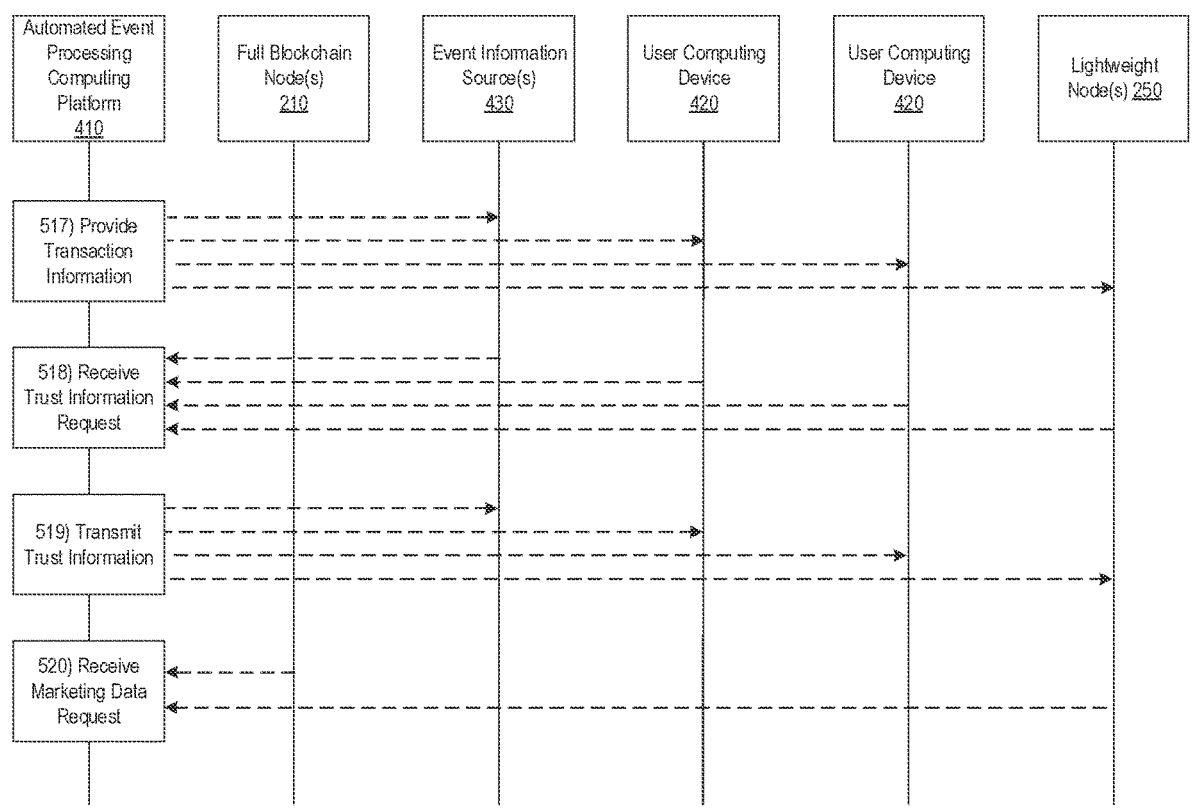

Turning to FIG. 5E, at step 517, the automated event processing computing platform 410 may provide transaction information from the one or more event records that match the criteria. The automated event processing computing platform 410 may send the requested transaction information to whichever device requested the transaction information and/or the automated event processing computing platform 410 may send the requested transaction information to some other device as requested by the requester. For example, a first user may request that the automated event processing computing platform 410 send transaction information to a second user in order to resolve a payment dispute between the first user and the second user.

The automated event processing computing platform 410 may provide limited information about the transaction unless the requester demonstrates privileges to access additional information. For example, the automated event processing computing platform 410 may (by default) provide proof that a transaction was made from one (pseudonymous) blockchain identifier to another. However, if the requester is a user involved in the transaction or can otherwise demonstrate authorization of the user (e.g., if the request includes data signed by a private key of the user), the automated event processing computing platform 410 may provide additional information such as the user's name or other identifying information, which the automated event processing computing platform 410 may obtain from the ID database 415.

At step 518, the automated event processing computing platform 410 may receive a trust information request from a user or some other party. The request may comprise an identifier of a user for which trust information is sought. In some cases, the request may also comprise credentials (e.g., an authorization signed by the user's private key) demonstrating that the user associated with the trust information has consented to access of the trust information. In this way, a user may control who may receive access to the user's trust information. In some cases, the credentials may allow access to the user's trust information for a limited time. Therefore, a user may control who may access the trust information and for how long. Accordingly, the automated event processing computing platform 410 may verify the credentials provided in the request, and reject the request if the credentials are invalid and/or expired. Additionally or alternatively, the user may allow any party to access the trust information (e.g., if the user is interested in unsolicited offers). A user may use a portal (e.g., a web portal similar to the portal illustrated at FIGS. 6A-6B) to log into the automated event processing computing platform 410 and configure the access settings in order to configure who may access the trust information.

The automated event processing computing platform 410 may responsively determine a blockchain identifier for the user (if the identifier in the request is not the blockchain identifier) and locate trust information for the identified user (e.g., the most recently generated trust information). Then, at step 519, the trust information may be sent to the requesting device. Thus, the trust information may be used for smart contracts or other transactions that take place off the one or more blockchains of the blockchain network.

At step 520, the automated event processing computing platform 410 may receive a request for marketing data. The automated event processing computing platform 410 may generate anonymized and/or aggregated marketing data from the event information stored on the blockchain. Such marketing data may be stored in marketing database 416. For example, the automated event processing computing platform 410 may generate data indicating what types of purchases are made by certain demographic and/or trust market segments (e.g., preferred products, preferred stores, and the like for certain demographic groups and/or groups associated with certain trust information). The marketing data may include trends such as increases or decreases in certain types of purchases for certain demographic and/or trust market segments, and other such data about purchasing habits and how they change over time. The marketing data trust segments may be defined to include certain ranges (e.g., a segment for all users with trust information over a first threshold, another segment for users with trust information below the first threshold but above a second threshold, and the like) or clusters of trust information.

The automated event processing computing platform 410 may require payment of tokens in exchange for marketing data. As discussed above, tokens may be provided to nodes that participate in the blockchain network 200 as full nodes 210 by generating new blocks. Accordingly, third parties that desire marketing data may be incentivized to participate in the blockchain network 200. Additionally or alternatively, tokens may be provided to users that choose to supply event information from event information sources 430. Other third parties that desire marketing data (e.g., third parties associated with lightweight nodes 250) may provide incentives for users to transfer their tokens to the third parties so that the third party may use the tokens to purchase marketing data.

For example, a third party may provide a discount, rebate, or other award to a user that transfers tokens to the third party. Another third party may offer loyalty points (e.g., airline miles or credit card points) to a user that transfers tokens to it. Thus, users and/or third parties may be incentivized to participate in the blockchain network 200.

Figure 5F:
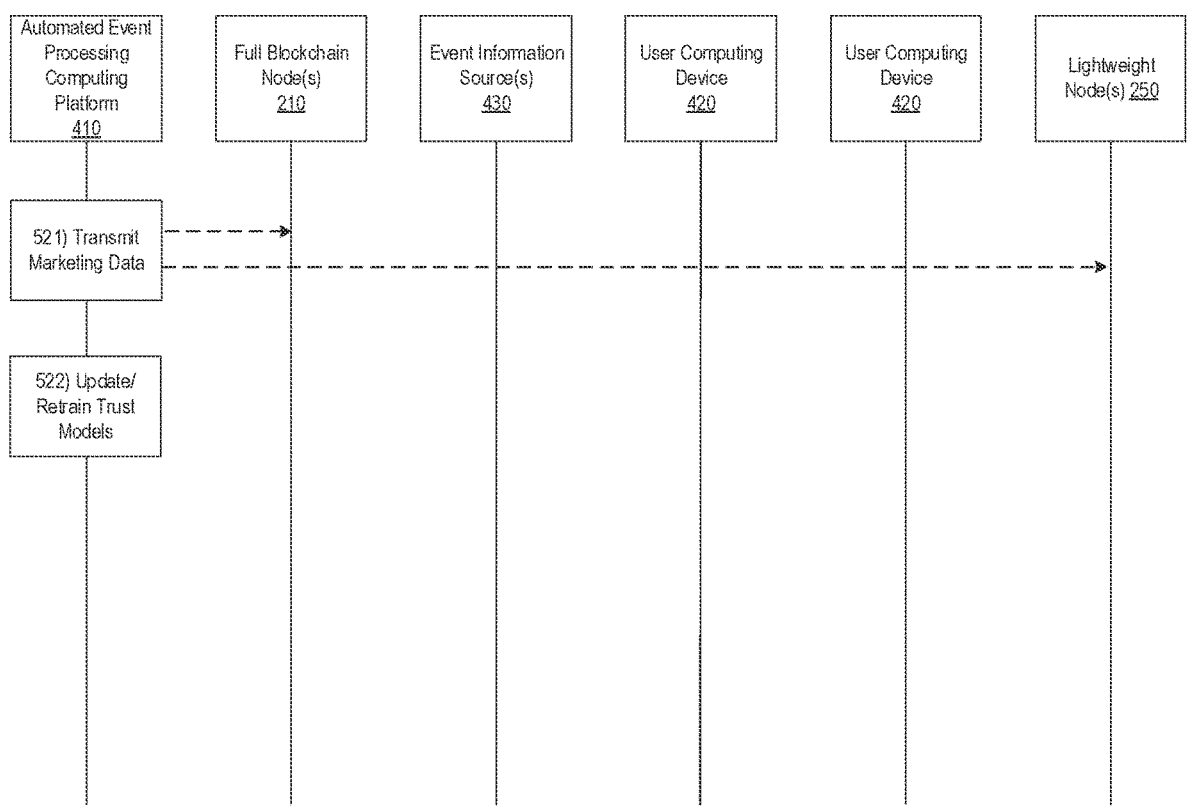

Turning to FIG. 5F, at step 521, the automated event processing computing platform 410 may provide the marketing data to the requesting device. The automated event processing computing platform 410 may provide an amount of marketing data commensurate with the payment of tokens from the requesting device. As discussed above, the provided marketing data may be anonymized (e.g., stripped of user identifiers) and/or aggregated (e.g., compiled into aggregate statistics).

At step 522, the automated event processing computing platform 410 may periodically update its training data set to include all or some of the event information received since the last time the trust models were updated. The automated event processing computing platform 410 may then proceed to retrain the one or more trust models based on the updated training data.

The process of FIGS. 5A-5F may repeat periodically, and some of the steps may repeat in different orders. For example, as discussed above, step 501 may repeat whenever a new user agrees to provide event information from one or more accounts. Steps 502-506 may repeat periodically and/or based on the receipt of event information by the automated event processing computing platform 410. Steps 507-508 may repeat at certain intervals set by the blockchain network and/or whenever the full node 210 of the automated event processing computing platform 410 is able to generate a new block (e.g., after finding a hash for a proof of work consensus algorithm). Steps 509-510 may repeat whenever the automated event processing computing platform 410 receives a request to initialize a smart contract. Steps 511-513 may repeat whenever the automated event processing computing platform 410 receives a request to execute a smart contract function. Steps 514-515, like steps 507-508, may repeat at certain intervals set by the blockchain network and/or whenever the full node 210 of the automated event processing computing platform 410 is able to generate a new block. Steps 516-517 may repeat whenever the automated event processing computing platform 410 receives a request for transaction information. Steps 518-519 may repeat whenever the automated event processing computing platform 410 receives a request for trust information. Steps 520-521 may repeat whenever the automated event processing computing platform 410 receives a request for marketing information. And step 522 may repeat periodically, among other variations.

Figure 7:
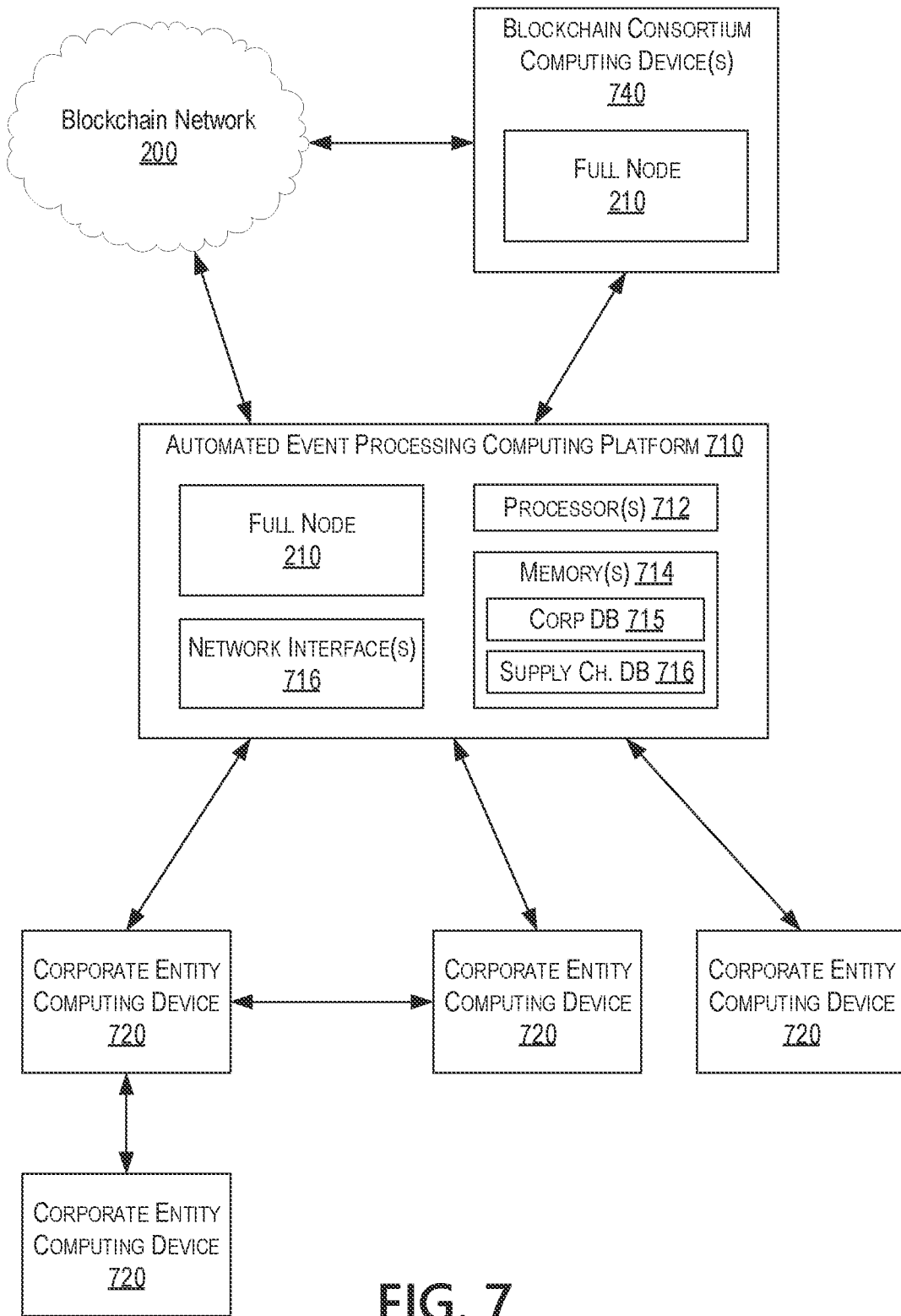
FIG. 7 depicts an illustrative operating environment for implementing aspects described herein.

FIG. 7 depicts an illustrative system and operating environment for implementing additional features of the present disclosure. In the system of FIG. 7, an automated event processing computing platform 710 may interact with one or more corporate entity computing devices 720, which may further interact with each other according to various supply chains. For example, corporations associated with the various corporate entity computing devices 720 may buy and sell goods and services from and to the other corporations. Some or all of the corporate entity computing devices 720 may provide information about the transactions and supply chains to the automated event processing computing platform 710.

The automated event processing computing platform 710 may connect to a blockchain network, such as blockchain network 200. The blockchain network 200 may be a permissioned blockchain network created by a blockchain consortium (e.g., a consortium of organizations that provide financial or related services to corporations). Information about the transactions and corporate supply chains may be stored on the blockchain in encrypted form and/or access to the blockchain may be restricted such that the information is not made public.

The automated event processing computing platform 710 may implement a node of the blockchain network, such as a full node 210 such that the automated event processing computing platform 710 may participate in the one or more blockchains of the blockchain network 200. The automated event processing computing platform 710 may implement the node as a physical device that makes up part of the automated event processing computing platform 710 and/or may implement the node as a virtualized device and/or software module running inside hardware of the automated event processing computing platform 710. In some examples, the automated event processing computing platform 710 may implement multiple (e.g., virtualized) nodes that interact with multiple blockchains (e.g., one blockchain per node) on the same blockchain network 200 and/or different blockchain networks.

Figure 8A:
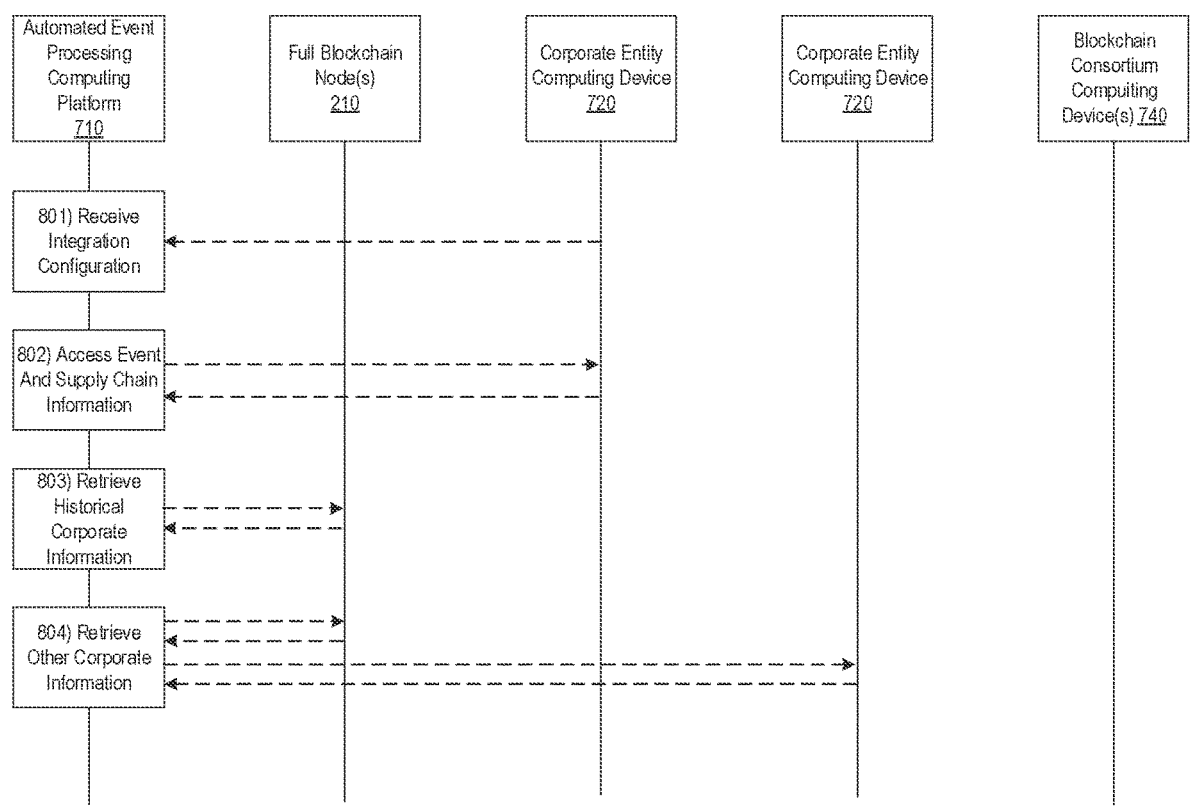
FIGS. 8A, 8B, 8C, 8D, and 8E illustrate an example process that may be implemented by a computing platform in accordance with one or more aspects described herein.

FIGS. 8A-8E depict an example method by which the automated event processing computing platform 710 may perform functions described herein, including generating and maintaining a blockchain containing trust information for corporate entities. Turning to FIG. 8A, at step 801, the automated event processing computing platform 710 may receive integration configuration information for accessing event and supply chain information for the corporation. For example, the corporation may expose APIs for the automated event processing computing platform 710 to securely access its internal event and supply chain information (which may be available from a corporate entity computing device 720), such as information about past, current, and future supply chains, information about other transactions for the corporation, and other such information about asset flows to and from the corporation. Thus, the integration configuration information may include information about how to access the API (e.g., how to format API requests) as well as credential information for securely accessing the API. A PI requests received from the corporate entity computing device 720 may include a blockchain identifier for the corporation. Other methods of integrating with the corporate records may be used as well. For example, the corporation may configure its internal systems to periodically push the relevant information to the automated event processing computing platform 710. The pushed information may include a blockchain identifier for the corporation.

In some cases, the automated event processing computing platform 710 may be affiliated with (e.g., part of or located inside the corporate network of) the corporation from which the event and supply chain information is received.

The automated event processing computing platform 710 may provide incentives to corporations for providing the supply chain and/or event information. Such incentives may include providing blockchain tokens and/or providing products and services (e.g., financial products and services) at reduced prices or interest rates.

The supply chain information may describe the relationships between corporate and other entities involved in delivering a good or service to one or more customers. It may describe how goods and/or services are supplied from entity to entity in order to support and supply the provision of a good and/or service by a particular corporate entity. A data structure for storing the supply chain information may include corporate or other entities as nodes of a graph, and the provision of goods and services between corporate or other entities as links between nodes of the graph. Each node may be associated with information such as an identifier (e.g., of the corporate entity), a location of the entity, trust information for the entity, and other such entity information. Each link may be associated with information such as an identification of the direction of the link (e.g., which node is the buyer and which is the seller), an identification of the goods or services provided, a number of goods provided, a cost of the goods or services provided, an expected date or frequency of the goods or services provided, and other such information.

After completing step 801, the automated event processing computing platform 710 may be able to access event and supply chain information associated with the corporation from a corporate entity computing device 720. Accordingly, at step 802, the automated event processing computing platform 710 may send periodic requests to the corporate entity computing device 720 and responsively receive event and supply chain information therefrom.

At step 803, the automated event processing computing platform 710 may retrieve historical corporate information for the corporation from which the event and supply chain information was received at step 802. Such information may be stored on one or more blockchains of the blockchain network, and may include previous event information (e.g., previous transactions as well as previous corporate events such as incorporations, IPOs, and other such events). In some examples, additional corporate information (e.g., country of incorporation or other background information) may be stored in and retrieved from a database of the automated event processing computing platform 710 (e.g., corporate database 715).

At step 804, the automated event processing computing platform 710 may retrieve supply chain information for other corporations involved in the supply chains received at step 802. The other corporate supply chain information may be stored on one or more blockchains of the blockchain network 200 and/or may be stored in a database of the automated event processing computing platform 710 (e.g., in supply chain database 716). In some examples, each corporation may be associated with a corporate blockchain, which may be identified by the corporation's blockchain identifier. The automated event processing computing platform 710 may access the desired corporate blockchain in order to retrieve the supply chain information therefrom. The corporate blockchain may be stored in memory 220 of the full node computing device 210 that is part of the automated event processing computing platform 710 (and/or in memory 260 of the lightweight node computing device 250 that is part of the automated event processing computing platform 710). The automated event processing computing platform 710 may repeat this process to collect supply chain information for each of the corporations involved with the supply chain received at step 802. If supply chain information for the other corporation is not stored on the blockchain, the automated event processing computing platform 710 may send a request to a corporate entity computing device 720 seeking information about the corporation and/or its supply chains that involve the corporation from which supply chain information was received at step 802.

In some cases, a corporate blockchain may be stored on another full node 210 (e.g., not every full node 210 of the blockchain network 200 may store each corporate blockchain or the entirety of each corporate blockchain). Accordingly, if the automated event processing computing platform 710 does not have all or part of the corporate blockchains needed for steps 803 or 804, the automated event processing computing platform 710 may request the relevant corporate blockchain (e.g., by sending a request for a corporate blockchain associated with the corporation's blockchain identifier) from another full node 210 of the blockchain network 200 that does have such information.

The corporate blockchains may be sidechains that relate to a main chain containing the trust information for the corporations. In other words, a main chain may include trust information for the corporations, and one or more other sidechains may include the event and supply chain information for some or all of the corporations. In this example, the automated event processing computing platform 710 may regularly add received event and supply chain information to the one or more side chains and periodically update the trust information on the main chain.

Figure 8B:
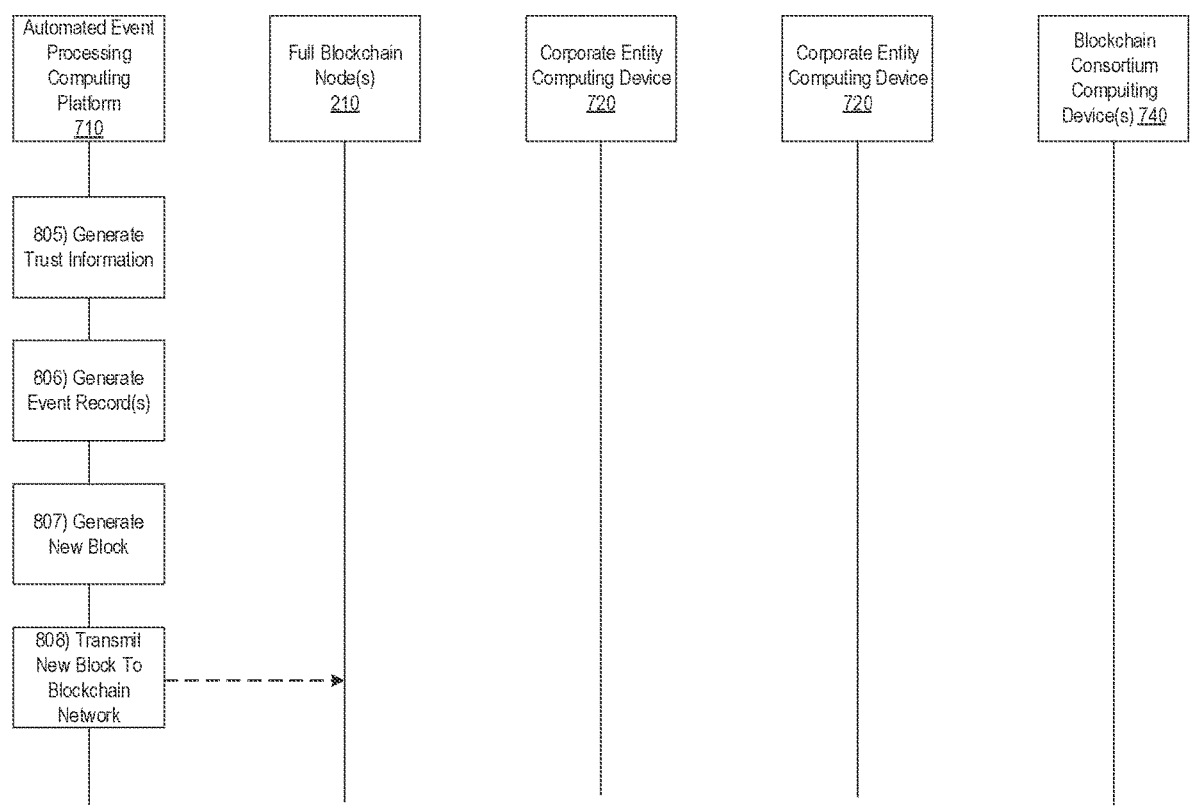

Turning to FIG. 8B, at step 805, the automated event processing computing platform 710 may generate corporate trust information based on the received event and supply information, the historical corporate information received at step 803, and the other corporation supply chain information retrieved at step 804. The automated event processing computing platform 710 may use one or more models to generate the trust information using the received event and supply chain information, the historical corporate information, and other corporation supply chain information as an input. The one or more models may be trained by the automated event processing computing platform 710 using machine learning and/or statistical techniques.

For example, prior to executing the method of FIGS. 8A-8E, the automated event processing computing platform 710 may have trained a model to output trust information using a training data set comprising corporate information for a large number of corporations and one or more target variables. The corporate information may include transaction information, which may indicate an asset that was exchanged, a value of the asset, whether the corresponding corporation in the training data set was a buyer or seller of the asset, a time of the asset exchange, as well as similar such information for the transaction counterparty. The corporate information may further include supply chain information, such as regular and/or planned asset purchases or sales to other corporations, the amount of planned assets purchases or sales, identifiers of each of the corporations involved in the supply chains, trust information associated with each of the corporations involved in the supply chains, and the like. The corporate information may further include background information for the corresponding corporation of the training data set, such as corporate history, state or country of incorporation, credit rating of the corporation, and other such information about the corresponding corporation. The one or more target variables may indicate, for example, whether the corresponding corporation in the training data set made payments on a loan obligation, performed or failed to perform part of a contract, or other evidence of high or low trustworthiness. The automated event processing computing platform 710 thus may train the one or more models using the training data set to output trust information (e.g., by developing a neural network that maps the input data to the one or more target variables).

The automated event processing computing platform 710 may also have trained the model (or a separate model) to generate trust information based on a comparison of supply chain information related to various corporate entities. For example, such a model may be trained to recognize discrepancies between supply chain information received from a first company that relates to a second company and supply chain information received from a second company that related to a first company. Such discrepancies may indicate a lack of accurate bookkeeping or otherwise indicate low trustworthiness.

The trained model(s) may tend to indicate higher or lower levels of trust based on the corporation information (including event and supply chain information) and associated data. For example, the trained model may tend to indicate a lower level of trust if a corporation's supply chains involve other corporations with low trust information. In this example, the model may be trained to provider greater or lesser weight to low corporate trust information based on a relative position in the supply chain. For example, low trust suppliers upstream of the corporate entity may be weighted more heavily than low trust buyers downstream of the corporate entity. Additionally or alternatively, the trained model may tend to indicate a lower level of trust if the corporation is incorporated in certain countries (e.g., with undeveloped legal systems) as opposed to other countries. Additionally or alternatively, the trained model may tend to indicate a higher level of trust based on certain corporate information (e.g., a long history since incorporation, a low indebtedness) or a lower level of trust based on other corporate information (e.g., a pending lawsuit against the corporation). Additionally or alternatively, the trained model may tend to indicate a lower level of trust based on discrepancies between supply chain information for the various corporations, as discussed above. Accordingly, the model may determine trust information based on the inputted event and supply chain information. The trust information may be a continuous numerical value (e.g., a score within a range) and/or a discrete category. For example, discrete categories may include a range from trust category 1 up to trust category 5.

The automated event processing computing platform 710 may avoid executing step 805 to generate trust information each time new event and supply chain information is received for a corporation. For example, the automated event processing computing platform 710 may check a timestamp associated with the most recent generated trust information (which may be stored in a block 227 of a main blockchain 226 of the blockchain network 200), and generate trust information if the timestamp is older than a certain threshold period of time. As another example, the automated event processing computing platform 710 may determine that a certain threshold number of events have been stored on a blockchain (e.g., a side blockchain containing corporate information) since the last trust information was generated, and responsively generate updated trust information.

At step 806, after generating the trust information by inputting the received event and supply chain information and historical corporate information into the trained model to output the user trust information, the automated event processing computing platform 710 may generate an event record containing information about the received event and supply chain information and/or the generated trust information. The automated event processing computing platform 710 may create the event record and, if the event represents a transaction, populate it with transaction information such as the seller of an asset (e.g., the blockchain identifier of the corporation if the corporation is the seller, or of the counterparty if the counterparty is the seller), the buyer of an asset, any other parties involved in the transaction, and an amount of the asset. As another example, if the event involves supply chain information (e.g., listings of buyers and sellers of assets to and from the corporation, as well as transactions taking place upstream or downstream of the corporation), the automated event processing computing platform 710 may populate the event record with relevant information such as the identifiers of the associated corporations (e.g., the blockchain identifiers) and the planned asset sales and purchases throughout the supply chain.

In some cases, the event record may also include the trust information. The automated event processing computing platform 710 may thus include trust information in the blockchain together with the event information. Additionally or alternatively, the trust information may be stored on one blockchain (e.g., a main chain) and the event information may be stored on another blockchain (e.g., a sidechain). For events involving two or more parties (e.g., transactions from one party to another party), events may be generated for different blockchains corresponding to each party. For example, the automated event processing computing platform 710 may generate records for both a seller associated with a first corporate blockchain and a buyer associated with a second corporate blockchain. Additionally or alternatively, the automated event processing computing platform 710 may generate an event record for each corporation involved in a corporate supply chain. Therefore, at step 806 the automated event processing computing platform 710 may generate two or more event records (one for each blockchain on which the event and supply chain information and/or trust information will be stored).

At step 807, the automated event processing computing platform 710 may generate one or more new blocks containing several event records associated with various event and supply chain information (e.g., after receiving a plurality of event and supply chain information). It should be understood that steps 801-806 could be repeated (e.g., sequentially or in batches) for a plurality of such information related to a plurality of corporations before generating a new block comprising event records for the various information. Therefore, the generated new block may comprise a large number of event records.

If the automated event processing computing platform 710 generates event records for more than one blockchain (e.g., a main chain and one or more side chains), the automated event processing computing platform 710 may repeat step 807 to generate the new blocks for the multiple blockchains. The automated event processing computing platform 710 may implement a trusted node (e.g., for a permissioned blockchain network) and therefore may not need to demonstrate entitlement to generate the new block in accordance with a consensus algorithm.

When the automated event processing computing platform 710 successfully generates a new block, it may award blockchain tokens to the corporations associated with the event and supply chain information of the new block. The corporations may thus receive tokens as an incentive to store their associated event and supply chain information on the blockchain(s), and to allow trust information to be generated therefrom.

At step 808, the automated event processing computing platform 710 may transmit the generated new block(s) to the other full nodes 210 of the blockchain network 200. Each full node 210 may verify the new block and add the new block to the blockchain, and the blockchain will continue growing therefrom.

Figure 8C:
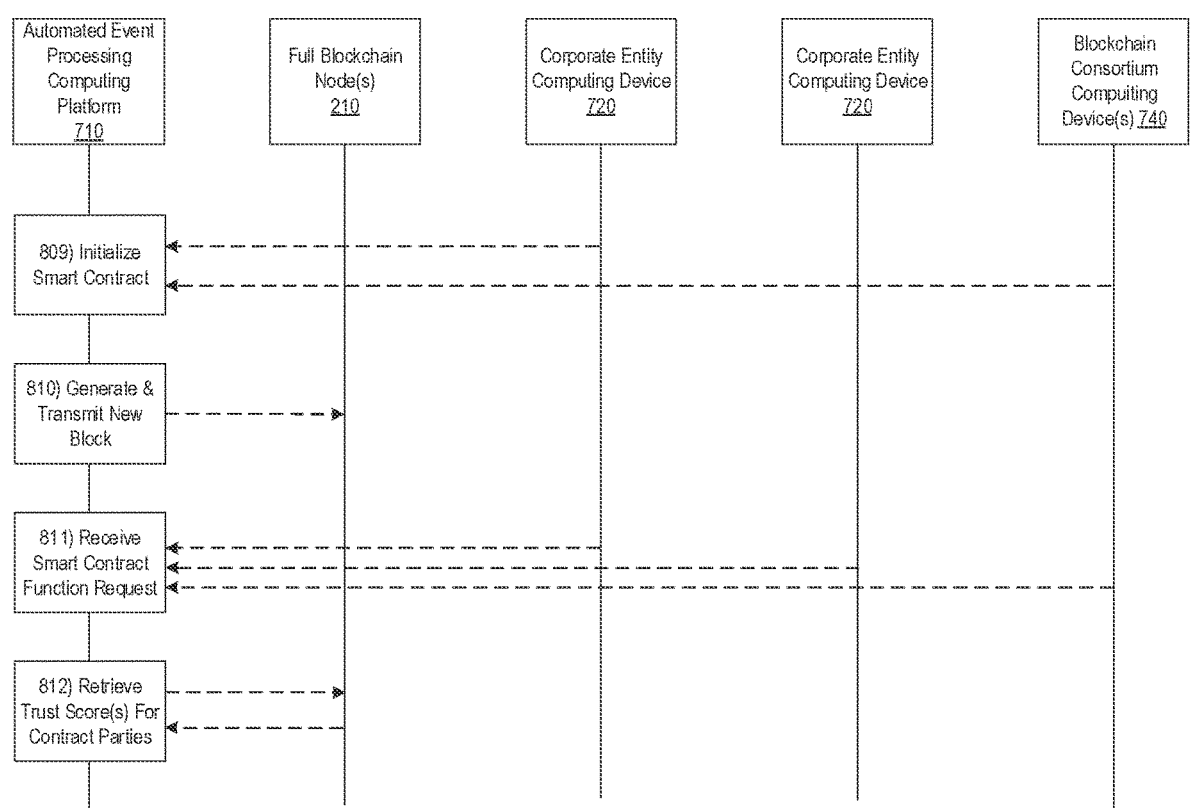

Turning to FIG. 8C, at step 809, the automated event processing computing platform 710 may receive a request (e.g., from a corporate entity computing device 720 or a blockchain consortium computing device 740) to initialize a smart contract. The smart contract may contain executable instructions that may be placed on the blockchain (e.g., in an event record of a new block). The smart contract may include an initialization function that the automated event processing computing platform 710 may execute before placing the initialized smart contract on the blockchain. For example, the initialization function may create data structures, populate variables, and create other such data for use by the smart contract. Thus, a new event record containing the smart contract may contain executable code as well as associated data.

Initializing a smart contract may require the requesting entity to pay a certain amount of blockchain tokens (e.g., to the automated event processing computing platform 710 for initializing the smart contract). The amount may vary based on the complexity of the smart contract and/or the initialization function (e.g., how much processing power is required to execute the smart contract and/or initialization function). Additionally or alternatively, the amount may vary based on the length of the smart contract and associated data (e.g., in bytes). The blockchain consortium computing device 740 may obtain tokens by creating new blocks or otherwise purchase tokens so that it may pay the required amount of tokens to initialize and/or execute the smart contract. Similarly, corporations that do not have sufficient tokens to execute or initialize a smart contract may purchase the tokens (e.g. on a token exchange or from another computing device) before sending a request.

At step 810, the automated event processing computing platform 710 may again generate and transmit a new block containing event records including an event record containing the (initialized) smart contract. As discussed above for steps 807-808, the new block may contain a plurality of other event records for various events (e.g., supply chain information, corporate information, other smart contracts, and the like), and the automated event processing computing platform 710 may transmit the new block to the other nodes on the blockchain network 200.

At step 811, the automated event processing computing platform 710 may receive a request to execute a function of the smart contract. The request may be received from any party; however, the smart contract may specify which parties are allowed to invoke certain functions. Some functions may only be accessed by the entity that created the smart contract. For example, a corporate entity may create a smart contract to purchase goods containing a function that allows the corporate entity to designate the goods as satisfactory quality before the corporate entity's payment is released to the seller. Accordingly, the request may contain a value that the function of the smart contract may use to execute conditional or other logic. As another example, the smart contract may have a function to cancel the smart contract that only the creator may access.

Some functions may be accessed by potential counterparties. For example, a corporate entity looking for a loan may create a smart contract to allow potential lenders to bid on a loan to the corporate entity. The potential bidders may access a smart contract function for offering a particular amount and/or interest rate. The potential counterparties may send the request to execute the function via a corporate entity computing device 720 (e.g., if another user is bidding on the loan) and/or via a blockchain consortium computing devices 740 (e.g., if a financial institution is bidding on the loan). Accordingly, the request may contain multiple values (e.g., an interest rate, a loan amount, and the like) that the smart contract may use and/or store. Such a bidding function may be configured to receive multiple offers before deciding (e.g., automatically and/or based on user input) which offer(s) to accept The request to perform the smart contract function may specify a smart contract address and the function to be executed. Based on the smart contract address, the automated event processing computing platform 710 may identify a block of the blockchain that stores the smart contract, retrieve the identified block, and extract the smart contract. The automated event processing computing platform 710 may also require payment of a certain amount of blockchain tokens for executing the smart contract function. Therefore, the function request may also include a token payment to a blockchain address associated with the automated event processing computing platform 710.

The smart contract may beneficially access the corporation trust information stored on the blockchain. For example, a function of the smart contract (including an initialization function or any other function) may conditionally execute a function based on a value of the trust information for a corporate entity or a counterparty. Thus a function of the smart contract may only execute if a corporate entity or counterparty is associated with a sufficiently high level of trust and/or if the corporate entity or counterparty falls into one of a subset of discrete trust categories. For example, a smart contract for a loan may require reduced collateral and/or a reduced interest rate if the loanee has qualifying (e.g., over a first threshold value) trust information. Additionally or alternatively, the loan smart contract may only allow loans to be made to loanees with sufficiently high (e.g., over a second threshold value) trust information. In the loan example, the second threshold value may be lower than the first threshold value.

Therefore, at step 812, the automated event processing computing platform 710 may retrieve trust information for one or more parties of the contract as needed before executing the requested function. If the automated event processing computing platform 710 does not have access to trust information (e.g., if the automated event processing computing platform 710 implements a lightweight node 250 that does not store an entire blockchain), the automated event processing computing platform 710 may request the trust information from other nodes on the blockchain network 200 by sending a request to another node to retrieve trust information associated with a blockchain identifier. The other node may respond with one or more relevant blocks 227, which the automated event processing computing platform 710 may verify before extracting the trust information.

Figure 8D:
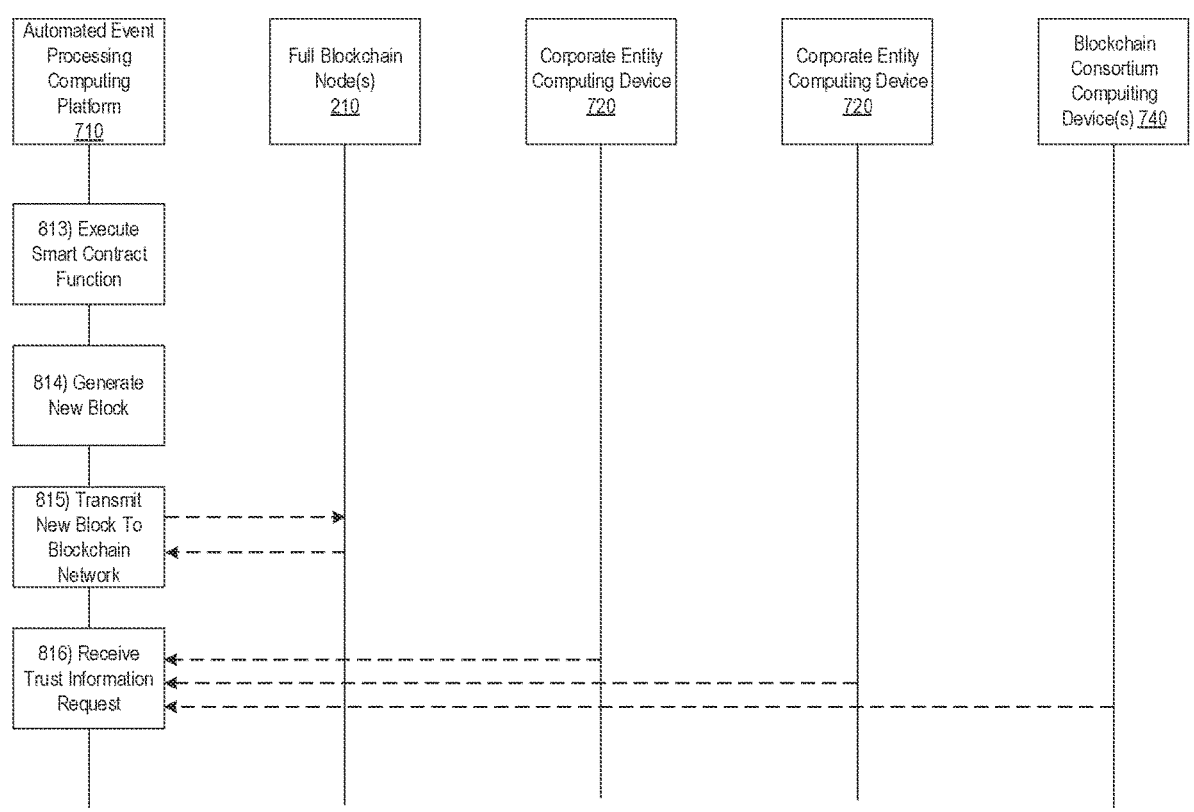

Turning to FIG. 8D, at step 813, the automated event processing computing platform 710 may execute the smart contract function. Execution of some functions may require updating the blockchain (e.g., in order to store data generated or changed during the execution of the function). For example, if the function receives a loan bid from a potential lender, the function may require an update in order to store the potential bid on the blockchain. Execution of other functions may not require any blockchain update. For example, some functions may allow users to read or view data previously generated or stored by the smart contract.

At step 814, if the function causes data to be generated and/or modified, the automated event processing computing platform 710 may generate a new event record storing the updated state of the smart contract. The event record may store any updated data structures and/or other data that was changed by executing the smart contract function.

At step 815, the automated event processing computing platform 710 may again generate and transmit a new block containing event records including the event record with the updated smart contract information. As discussed above for steps 807-808, the new block may contain a plurality of other event records for various events (e.g., transactions, user information, other smart contracts, and the like), and the automated event processing computing platform 710 may transmit the new block to the other nodes on the blockchain network 200.

Figure 8E:
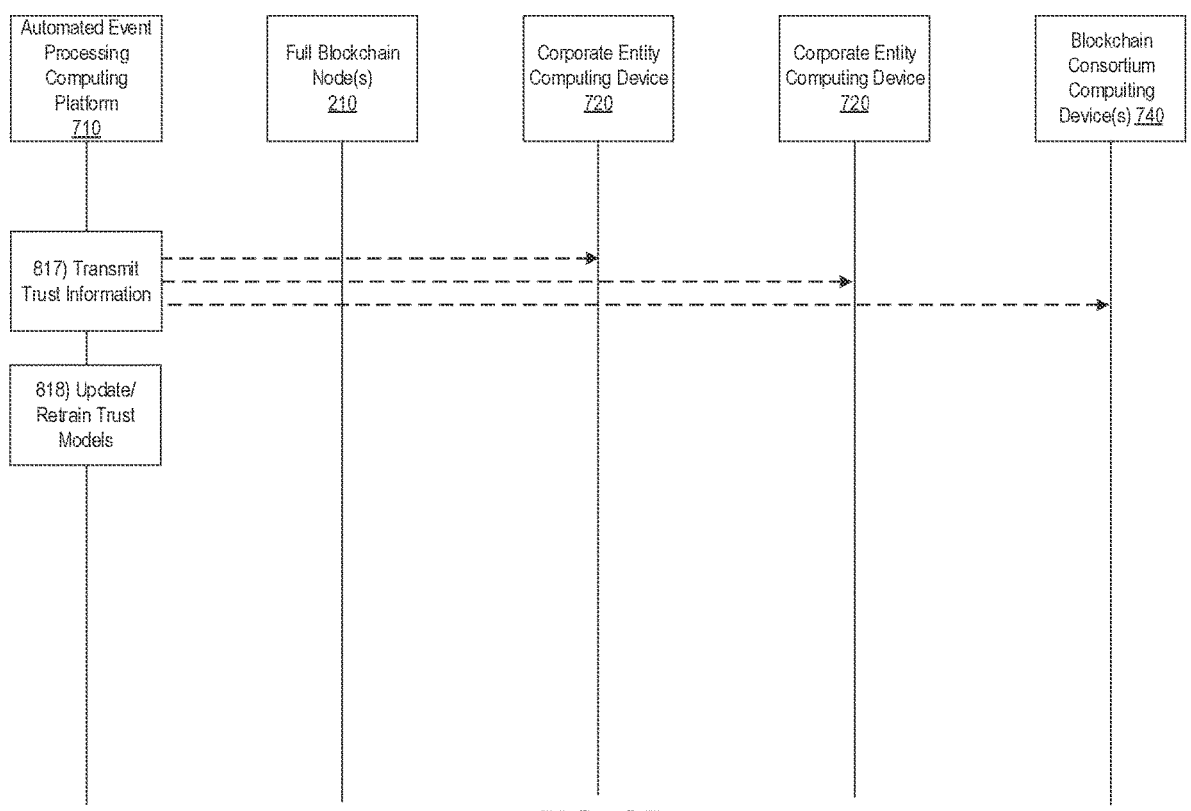

At step 816, the automated event processing computing platform 710 may receive a trust information request from a corporate entity or some other party. The request may comprise an identifier of a corporate entity for which trust information is sought. The automated event processing computing platform 710 may responsively determine a blockchain identifier for the corporate entity (if the identifier in the request is not the blockchain identifier) and locate trust information for the identified corporate entity (e.g., the most recent trust information). Turning to FIG. 8E, at step 817, the automated event processing computing platform 710 may send the trust information to the requesting device. Thus, the trust information may be used for smart contracts or other transactions that take place off the one or more blockchains of the blockchain network.

At step 818, the automated event processing computing platform 710 may periodically update its training data set to include all or some of the event information received since the last time the trust models were updated. The automated event processing computing platform 710 may then proceed to retrain the one or more trust models based on the updated training data.

The process of FIGS. 8A-8E may repeat periodically, and some of the steps may repeat in different orders. For example, as discussed above, step 801 may repeat whenever a new corporation agrees to participate in the blockchain by providing integration information to the 719. Steps 802-806 may repeat periodically and/or based on the receipt of event and supply chain information by the automated event processing computing platform 710. Steps 807-808 may repeat at certain intervals set by the blockchain network and/or whenever the full node 210 of the automated event processing computing platform 710 is able to generate a new block. Steps 809-810 may repeat whenever the automated event processing computing platform 710 receives a request to initialize a smart contract. Steps 811-813 may repeat whenever the automated event processing computing platform 710 receives a request to execute a smart contract function. Steps 814-815, like steps 807-808, may repeat at certain intervals set by the blockchain network and/or whenever the full node 210 of the automated event processing computing platform 710 is able to generate a new block. Steps 816-817 may repeat whenever the automated event processing computing platform 710 receives a request for trust information. And step 818 may repeat periodically, among other variations.

Figure 9:
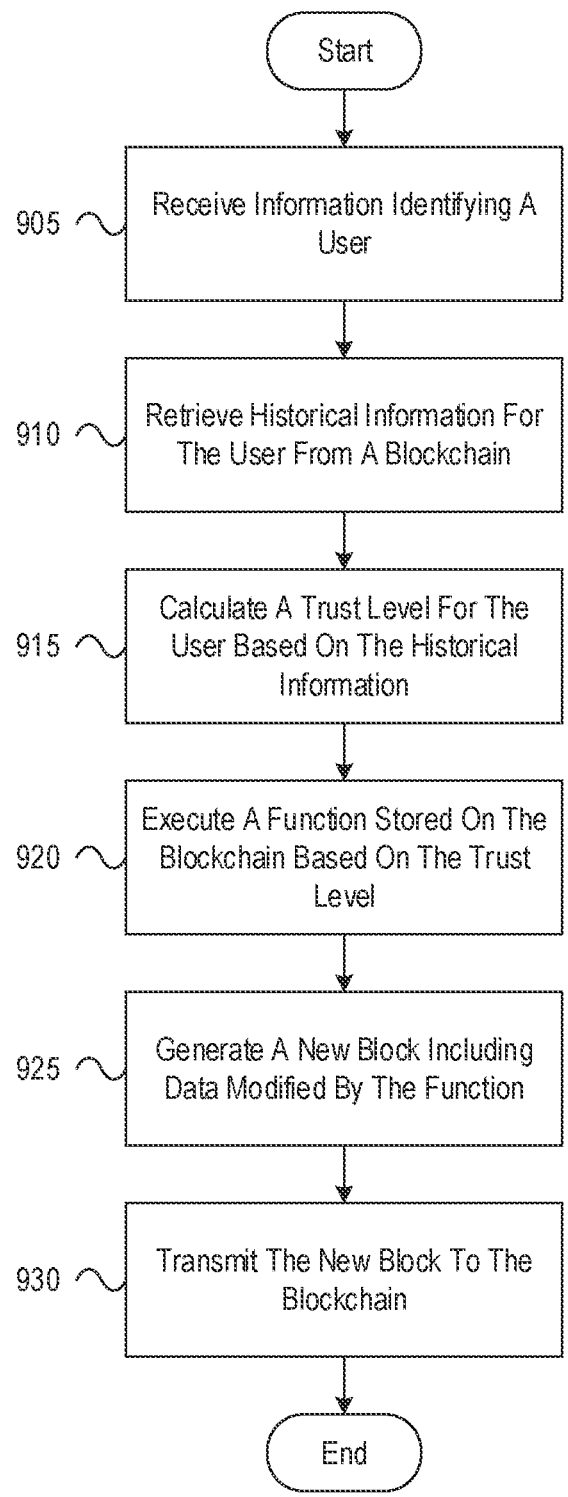
FIG. 9 illustrates an example process that may be implemented by a computing platform in accordance with one or more aspects described herein.

FIG. 9 illustrates an example process for executing functions based on a trust level associated with a user. At step 905, a computing platform comprising one or more processors, memory, and a network interface may receive, via the network interface, information identifying a user. At step 910, the computing platform may retrieve, from one or more blocks of a blockchain stored in the memory, a plurality of historical information associated with the user. At step 915, the computing platform may calculate, based on the historical information associated with the user, a trust level associated with the user. At step 920, the computing platform may execute a function stored on the blockchain, wherein the function comprises conditional logic based on the trust level associated with the user. At step 925, the computing platform may generate a new block comprising a data structure including data modified by the executed function.

At step 930, the computing platform may transmit the new block to a plurality of nodes that maintain the blockchain.

Figure 10:
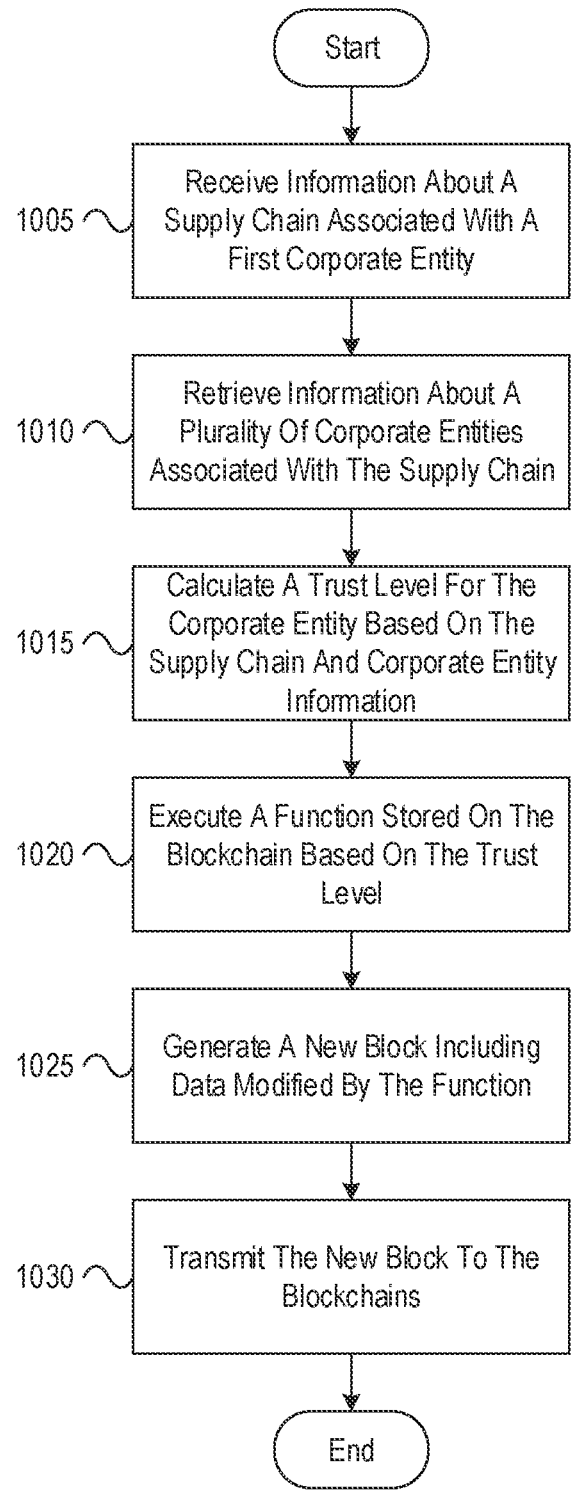
FIG. 10 illustrates an example process that may be implemented by a computing platform in accordance with one or more aspects described herein.

FIG. 10 illustrates an example process for executing functions based on a trust level associated with a corporate entity. At step 1005, a computing platform comprising one or more processors, memory, and a network interface may receive, via the network interface, information about a supply chain associated with a first corporate entity. At step 1010, the computing platform may retrieve, from one or more blockchains stored in the memory, information about a plurality of corporate entities associated with the supply chain. At step 1015, the computing platform may calculate, based on the information about the supply chain and on the information for the plurality of corporate entities, a trust level associated with the first corporate entity. At step 1020, the computing platform may execute a function stored on the blockchain, wherein the function comprises conditional logic based on the trust level associated with the first corporate entity. At step 1025, the computing platform may generate a new block comprising a data structure including data modified by the executed function. At step 1030, the computing platform may transmit the new block to a plurality of nodes that maintain the one or more blockchains.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method comprising:
   at a computing platform comprising one or more processors, memory, and a network interface:
      receiving, via the network interface, information identifying a user comprising an authorization signed by a user's private key;
      receiving, from a plurality of computing systems and via a network interface, event information associated with a user;
      matching, based on the event information, the event information to a blockchain identifier associated with the user;
      retrieving, based on the user's private key and from one or more blocks of a blockchain stored in the memory, historical information associated with the user;
      retrieving, from a block in the blockchain and based on the event information, a smart contract comprising a first function and a second function;
      calculating, by a plurality of trained models of the computing platform and based on the historical information associated with the user, a numerical trust level associated with the user, wherein the plurality of trained models of the computing platform calculate a higher numerical trust level or a lower numerical trust level based on specified information associated with the user and wherein the plurality of trained models of the computing platform is trained by a plurality of data sets using a neural network that maps the plurality of data sets to a plurality of target variables that indicate the numerical trust level;
      generating, based on the event information and the historical information, an event block comprising a first data structure including data modified by an executed first function and a trust block comprising a second data structure including data modified by an executed second function; and associating the event block to an event sidechain of a plurality of sidechains of the blockchain and the trust block to a main chain of the blockchain, wherein the trust block comprises a timestamp and wherein the event block is associated to a selected event sidechain of the plurality of sidechains of the block chain based on the timestamp of the trust block.

2. The method of claim 1, further comprising:
prior to the receiving the information identifying the user, receiving user authorization to access records maintained by one or more systems that record events about the user; and receiving, from the one or more systems that record events about the user, the historical information comprising historical event information.

3. The method of claim 1, further comprising determining, based on the information identifying the user, a blockchain identifier associated with the user, wherein the event block comprises the blockchain identifier.

4. The method of claim 1, wherein conditional logic executed by the first function and the second function executes when the trust level is above a threshold.

5. The method of claim 4, wherein the conditional logic adjusts a value based on the numerical trust level.

6. The method of claim 1, further comprising prior to the executing of the function, receiving, from the user, a payment of a token associated with the blockchain.

7. The method of claim 1, wherein the memory comprises a plurality of user blockchains associated with a respective plurality of users, further comprising:
generating, for a main blockchain that is separate from the plurality of user blockchains, a second new block comprising an event record that further comprises the historical information and the numerical trust level; and
transmitting the second new block to a plurality of nodes that maintain the blockchain.

8. The method of claim 1, wherein generating the event block causes the computing platform to receive tokens associated with the blockchain.

9. The method of claim 1, wherein the historical information comprises information about at least one or more of transactions with other users, locations of the transactions, or entities and amounts of the transactions.

10. The method of claim 9, wherein the historical information further comprises one or more of user demographic information, user credit report information, and information about user assets.

11. The method of claim 1, wherein the executed first function initializes the second function for receiving a bid on a loan to the user.

12. A computing platform comprising:
one or more processors;
a network interface; and
memory storing instructions that, when executed by the one or more processors, cause the computing platform to:
receive, via the network interface, information identifying a user comprising an authorization signed by a user's private key;
receive from a plurality of computing systems and via a network interface, event information associated with a user
match, based on the event information, the event information to a blockchain identifier associated with the user;

retrieve, based on the user's private key and the blockchain identifier and from one or more blocks of a blockchain stored in the memory, historical information associated with the user;

training, using a neural network, a plurality of models of the computing platform by mapping a plurality of input data sets to a plurality of target variables that indicate a trustworthiness level;

calculate, by the plurality of models of the computing platform and based on the historical information associated with the user, a numerical trust level associated with the user, wherein the historical information comprises a location of the user and a location of a transaction counterparty at a time of an associated transaction and wherein the plurality of models of the computing platform calculate a higher numerical trust level or lower numerical trust level based on specified information associated with the user;

generate, based on the event information and the historical information, an event block comprising a first data structure including data modified by an executed first function and a trust block comprising a second data structure including data modified by an executed second function; and associate the event block to an event sidechain of a plurality of sidechains of the blockchain and the trust block to a main chain of the blockchain, wherein the trust block comprises a timestamp and wherein the event block is associated to a selected event sidechain of the plurality of sidechains of the block chain based on the timestamp of the trust block.

13. The computing platform of claim 12, wherein the instructions further cause the computing platform to:
prior to receipt of information identifying the user, receive user authorization to access records maintained by one or more systems that record events about the user; and
receive, from the one or more systems that record events about the user, the historical information.

14. The computing platform of claim 12, wherein the memory comprises a plurality of user blockchains associated with a respective plurality of users, wherein the instructions further cause the computing platform to:
generate, for a main blockchain that is separate from the plurality of user blockchains, a second new block comprising an event record that further comprises the historical information and the numerical trust level; and
transmit the second new block to a plurality of nodes that maintain the blockchain.

15. The computing platform of claim 12, wherein the historical information comprises information about transactions with other users or entities and amounts of the transactions.

16. The computing platform of claim 15, wherein the historical information further comprises one or more of user demographic information, user credit report information, and information about user assets.

17. One or more non-transitory computer readable media storing instructions that, when executed by one or more processors of a computing platform, cause the computing platform to:
receive from a plurality of computing systems and via a network interface, event information associated with a user
match, based on the event information, the event information to a blockchain identifier associated with the user;

receive, via the network interface of the computing platform, information identifying a user comprising an authorization signed by a user's private key;

retrieve, based on the user's private key and from one or more blocks of a blockchain associated with the user identifier, historical information associated with the user;

calculate, by a plurality of trained models of the computing platform and based on the historical information associated with the user, a numerical trust level associated with the user, wherein the plurality of trained models of the computing platform calculate a higher numerical trust level or lower numerical trust level based on specified information associated with the user and wherein the plurality of trained models of the computing platform is trained by a plurality of data sets using machine learning techniques;

generate, based on the event information and the historical information, an event block comprising a first data structure including data modified by the executed first function and a trust block comprising a second data structure including data modified by the executed second function; and associate the event block to an event sidechain of a plurality of sidechains of the blockchain and the trust block to a main chain of the blockchain, wherein the trust block comprises a timestamp and wherein the event block is associated to a selected event sidechain of the plurality of sidechains of the block chain based on the timestamp of the trust block.

18. The one or more non-transitory computer readable media of claim 17, wherein the instructions further cause the computing platform to:

prior to receipt of information identifying the user, receive user authorization to access records maintained by one or more systems that record events about the users and receive, from the one or more systems that record events about the user, the historical information.

19. The one or more non-transitory computer readable media of claim 17, wherein the instructions further cause the computing platform to:

generate, for a main blockchain that is separate from a plurality of user blockchains, a second new block comprising an event record that further comprises the historical information and the numerical trust level; and transmit the second new block to a plurality of nodes that maintain the blockchain.

20. The one or more non-transitory computer readable media of claim 17, wherein the historical information comprises information about transactions with other users or entities and amounts of the transactions.

* * * * *

UNITED STATES PATENT AND TRADEMARK OFFICE
CERTIFICATE OF CORRECTION

PATENT NO. : 11,734,686 B2
APPLICATION NO. : 17/494158
DATED : August 22, 2023
INVENTOR(S) : Lee et al.

It is certified that error appears in the above-identified patent and that said Letters Patent is hereby corrected as shown below:

In the Specification

Column 2, Line 1:
Delete "supploy" and insert --supply-- therefor

In the Claims

Column 43, Claim 12, Line 64:
Delete "user" and insert --user;-- therefor

Column 44, Claim 17, Line 64:
Delete "user" and insert --user;-- therefor

Column 46, Claim 18, Line 10:
Delete "users" and insert --users;-- therefor

Signed and Sealed this
Twenty-ninth Day of October, 2024

Katherine Kelly Vidal
*Director of the United States Patent and Trademark Office*